(12) United States Patent
Gengler et al.

(10) Patent No.: US 11,098,500 B2
(45) Date of Patent: Aug. 24, 2021

(54) LOCKOUT MANAGEMENT SYSTEMS AND METHODS WITH MULTI-KEYHOLDER ELECTRONIC LOCKING DEVICES

(71) Applicant: NOKE, INC., Lehi, UT (US)

(72) Inventors: David P. Gengler, Draper, UT (US); Sean Louis Calkins, Midvale, UT (US); Kenneth Richard Goldthorpe, Eagle Mountain, UT (US); Kyle Blackburn Johnson, Orem, UT (US)

(73) Assignee: NOKE, INC., Lehi, UT (US)

( * ) Notice: Subject to any disclaimer, the term of this patent is extended or adjusted under 35 U.S.C. 154(b) by 345 days.

(21) Appl. No.: 16/430,250

(22) Filed: Jun. 3, 2019

(65) Prior Publication Data

US 2019/0368233 A1 Dec. 5, 2019

Related U.S. Application Data

(60) Provisional application No. 62/679,793, filed on Jun. 2, 2018, provisional application No. 62/811,644, filed on Feb. 28, 2019.

(51) Int. Cl.
*E05B 67/22* (2006.01)
*G07C 9/00* (2020.01)
*E05B 47/06* (2006.01)
*E05B 49/00* (2006.01)
*E05B 47/00* (2006.01)
*E05B 67/06* (2006.01)

(52) U.S. Cl.
CPC .......... *E05B 67/22* (2013.01); *E05B 47/0012* (2013.01); *E05B 47/0607* (2013.01); *E05B 49/00* (2013.01); *G07C 9/00857* (2013.01); *E05B 67/063* (2013.01); *E05B 2047/0095* (2013.01); *G07C 2009/00865* (2013.01)

(58) Field of Classification Search
CPC ................................. E05B 67/22; G07C 9/00
See application file for complete search history.

(56) References Cited

U.S. PATENT DOCUMENTS 7,845,202 B2   12/2010   Padilla et al.
9,804,590 B2   10/2017   Michalscheck et al.
10,125,519 B1  11/2018   Gengler et al.
(Continued)

FOREIGN PATENT DOCUMENTS

WO    2016004278 A1    1/2016

OTHER PUBLICATIONS

Search Report for International Application No. PCT/US2019/035269; dated Aug. 7, 2019.

*Primary Examiner* — K. Wong
(74) *Attorney, Agent, or Firm* — Barnes & Thornburg LLP; Jason Bernstein

(57) ABSTRACT

This disclosure provides systems and methods for lockout-tagout procedures and systems supporting the same, including, without limitation, locking devices that can store and be locked simultaneously by multiple keyholders. In various embodiments, a single user can add multiple keyholders to a locking device. The user may not be able to remove anyone as a keyholder except himself or herself. Thus, the locking device may remain in a locked state until each of the added keyholders applies their digital key, password, PIN, and/or other personal identifying information to unlock the locking device by removing themselves as a keyholder.

20 Claims, 20 Drawing Sheets

(56) References Cited

U.S. PATENT DOCUMENTS

| | | |
|---|---|---|
| 10,210,686 B2 | 2/2019 | Gengler et al. |
| 10,614,646 B1 * | 4/2020 | Douglass ............ G07C 9/00896 |
| 2013/0014552 A1 | 1/2013 | Bench et al. |
| 2016/0042582 A1 | 2/2016 | Hyde et al. |
| 2016/0217637 A1 | 7/2016 | Gengler et al. |

* cited by examiner

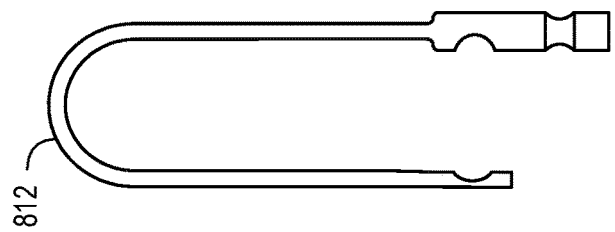
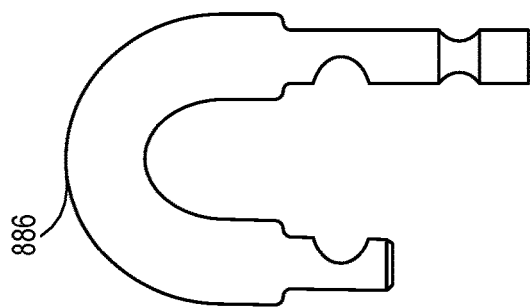
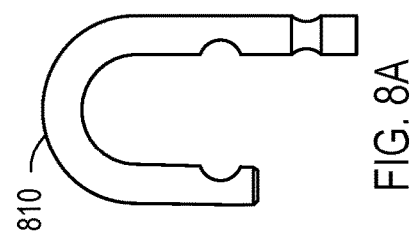
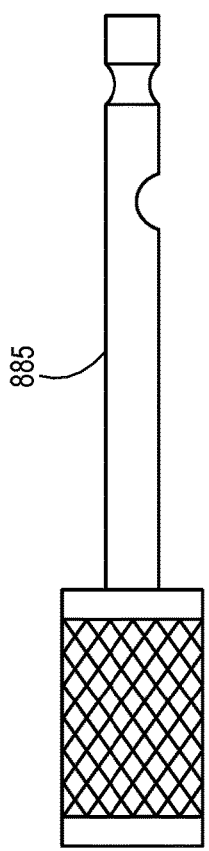

Types
Home / Types

Machines   Hazards

HAZARDS

Add Hazard

| Hazard Name | Manufacturer | Icon |
|---|---|---|
| Electrical | E | ● |
| Chemical | C | ● |
| Hydraulic | H | ● |
| Pneumatic | N | ● |
| Mechanical | M | ● |
| Residual | R | ● |
| Pressurized | P | ● |

Types

FIG. 26

Machines
Home / Machines search with specific keywords

SEARCH

MACHINES

Add Machine

| Machine Name | Identifier | Serial Number | Manufacturer | Status | |
|---|---|---|---|---|---|
| Tractor Co. 745 | BBJ | 555 | Tractor Co. | Active | ● |
| Tractor Co. 745 | A310 | A789554 | Tractor Co. | Active | ● |
| Tractor Co. 745 | 556 | 123 | Tractor Co. | Active | ● |
| Tractor Co. 745 | KBJ | 456 | Tractor Co. | Active | ● |
| Tractor Co. 745 | TJ | 999 | Tractor Co. | Active | ● |
| Tractor Co. 745 | PP2 | 652 | Tractor Co. | Active | ● |

Noke Demo

2700

FIG. 27 noke
no key no problem

Users
Home / Machines

Noke Demo search with specific keywords | SEARCH

USERS

Add User

| Name | MAC Address | Status | |
|---|---|---|---|
| PAJ-CDG-SADW | FC:DF:ER:DS:ER:RT | a8fc103c-642c-11e8-98a6-42010a800130 | ● |
| PAJ-CDG-SAFE | D3:36:BA:20:8A:99 | 80fc0b09-642c-11e8-98a6-42010a800130 | ● |
| PAJ-CDG-SAOC | F9:DF:9C:8A:FB:15 | a6768427-642c-11e8-98a6-42010a800130 | ● |
| PAJ-CDG-SAOE | C0:F1:19:05:F8:BD | a6b9d722-642c-11e8-98a6-42010a800130 | ● |
| PAJ-CDG-SADW | CE:3A:69:54:03:C5 | a6fe1eda-642c-11e8-98a6-42010a800130 | ● |
| PAJ-CDG-SAJQ | F9:8B:D0:D7:E8:9E | a741d9ec-642c-11e8-98a6-42010a800130 | ● |
| PAJ-CDG-SAOF | EE:EC:2F:DC:44:D2 | a7867ec3-642c-11e8-98a6-42010a800130 | ● |
| PAJ-CDG-SAOD | D0:26:1C:A7:48:F9 | a7f2f24a-642c-11e8-98a6-42010a800130 | ● |
| PAJ-CDG-SALB | D9:86:27:85:84:3A | a8351a18-642c-11e8-98a6-42010a800130 | ● |
| PAJ-CDG-SALE | C4:54:44:E5:74:D3 | a874e39a-642c-11e8-98a6-42010a800130 | ● |
| PAJ-CDG-SALA | C6:C6:EC:75:BE:B1 | a8b8d8f2-642c-11e8-98a6-42010a800130 | ● |
| PAJ-CDG-SALY | D8:7D:34:FB:55:3C | a8fc103c-642c-11e8-98a6-42010a800130 | ● |

User

LOCKOUT MANAGEMENT SYSTEMS AND METHODS WITH MULTI-KEYHOLDER ELECTRONIC LOCKING DEVICES

The Application Data Sheet (ADS) filed herewith is incorporated by reference in its entirety. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

This application claims priority to U.S. Provisional Patent Application 62/679,793 filed on Jun. 2, 2018, titled "Systems and Methods for Lockout-Tagout and Electronic Locking Devices with Multiple Keyholders," which application is incorporated herein by reference in its entirety. This application also claims priority to U.S. Provisional Patent Application 62/811,644 filed on Feb. 28, 2019, also titled "Systems and Methods for Lockout-Tagout and Electronic Locking Devices with Multiple Keyholders," which application is also incorporated herein by reference in its entirety.

RELATED APPLICATIONS

This application hereby incorporates by reference in their entireties: U.S. Pat. No. 10,125,519 titled "Wireless-Enabled Interchangeable Locking Core," granted on Nov. 13, 2018; U.S. patent application Ser. No. 16/258,096 titled "Electronic Lock and Interchangeable Shackles," filed on Jan. 25, 2019; and U.S. Pat. No. 10,210,686 titled "Electronic Padlocks and Related Methods," granted on Feb. 19, 2019.

If the listings of applications provided above are inconsistent with the listings provided in the ADS, it is the intent of the Applicant(s) to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure generally relates to wireless-enabled locking devices, such as Bluetooth locking devices. Specifically, this disclosure relates to multi-user locking systems.

BRIEF DESCRIPTION OF THE DRAWINGS

Non-limiting and non-exhaustive embodiments of the disclosure are described herein, including various embodiments of the disclosure with reference to the figures listed below.

FIG. 8A illustrates a standard shackle with a uniform diameter, according to one embodiment.

FIG. 8B illustrates a base-and-taper shackle that can be interchangeably used with various keyless electronic locks described herein, according to various embodiments.

FIG. 8C illustrates an extra-long base-and-taper shackle that can be interchangeably used with various keyless electronic locks described herein, according to various embodiments.

FIG. 8D illustrates a hitch receiver lock assembly that can be used interchangeably with the other shackles compatible with the various lock bodies described herein.

FIG. 8E illustrates an oversized shackle with tapered ends for compatibility with the various lock bodies described herein.

FIG. 20 illustrates an example GUI for a list of keyholders that are each required to unlock the locking device before the locking device can be removed from a locked machine.

FIG. 21 illustrates an example GUI of a prompt enabling the removal of a user from the lockout by entering a Personal Identification Number ("PIN").

FIG. 26 illustrates an example GUI for specifying lockout locations for a specific machine or type of machine.

FIG. 27 illustrates an example GUI for viewing the lockout status of managed machines and/or adding new machines.

FIG. 29 illustrates an example GUI for managing a list of network-enabled locking devices.

DETAILED DESCRIPTION

Figure 1:
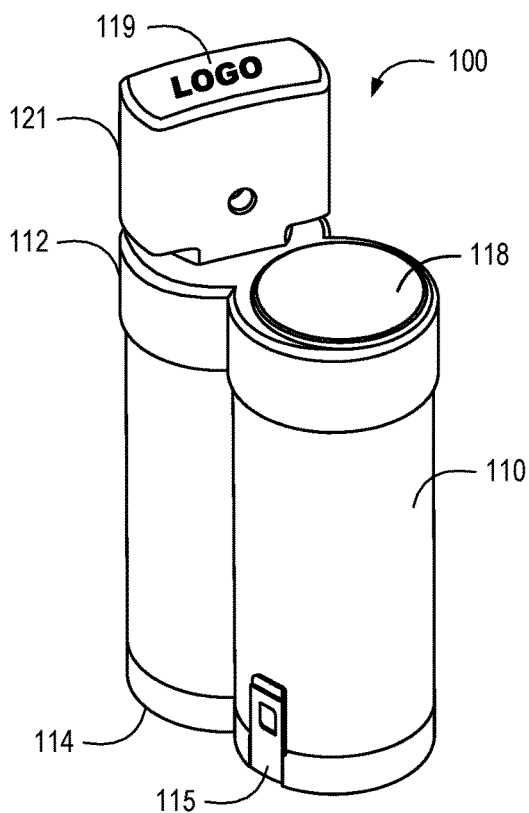
FIG. 1 illustrates a wireless-enabled interchangeable locking core compatible with the small format interchangeable core (SFIC) standard, according to one embodiment.

This disclosure generally relates to locks used in lockout and/or tagout procedures (herein referred to interchangeably as simply "lockout" or "lockout-tagout"). Lockout management systems and methods are described herein to facilitate the operation of lockout-tagout procedures. Lockout-tagout procedures may be used to ensure operator safety when dealing with hazardous energy machines and/or for compliance with requirements set forth by regulatory bodies like the Occupational Safety and Health Administration (OSHA) in the United States and similar organizations in other countries. Although the general description focuses on network-enabled padlock designs, such as the wireless-enabled Bluetooth™ padlock and associated systems, the same principles may be utilized with or adapted for use with a door lock, SFIC lock, LFIC lock, or any of a wide variety of alternative locking devices.

A wide variety of lock types and internal locking mechanisms have been developed over the years. Examples of lock technologies include mortise locks, padlocks, bored cylindrical locks, cylinder locks, warded locks, lever tumbler locks (e.g., 3- and 5-lever locks), Chubb detector locks, etc. Wireless-enabled adaptations of these and other lock technologies, and combinations thereof, may be utilized in conjunction with the systems and methods described herein.

This disclosure describes various systems and methods of locking and unlocking a multi-user or multi-keyholder lock. The term "lock" is used interchangeably herein with "locking device" and includes, without limitation, padlocks, door locks, small format interchangeable core (SFIC) locks, large format interchangeable core (LFIC) locks, or any other securing device with a locking mechanism. This disclosure relates to the use of Bluetooth, Wi-Fi, or other network-enabled locks. In this application, "Bluetooth" or "network-enabled" locks, locking devices, and locking systems generally refer to all network-enabled locks, including those using alternative network protocols and technologies, such as Wi-Fi, Z-wave, ZigBee, NFC, RFID, etc.

OSHA, various other regulatory agencies, industry standards, trade groups, company policies, and established safety practices set forth specific requirements to prevent the release of hazardous energy. The regulations protect machinery operators and repair technicians (e.g., authorized users) from the hazardous energy created by the machinery. Specifically, OSHA requires lockout-tagout procedures to prevent the release of hazardous energy while a repairman, technician, or operator is working on a machine. Lockout-tagout procedures prevent operators from operating an unsafe machine or from initiating the machine while it is being repaired. Following proper lockout procedures reduces the risk of catastrophic hazardous energy incidents. Hazardous energy produced by a machine can be life-threatening to personnel working on or with the machine. A poorly or under-maintained machine can distribute hazardous energy and kill an operator or repair technician.

A lockout-tagout procedure may be set forth as a series of steps to ensure operator safety in the event of a machine failure, scheduled maintenance, defect, or the like. For example, the sequence of steps for a lockout-tagout procedure could possibly include: (1) Proper identification of the equipment and locations of hazardous energy sources; (2) Notification to affected employees and personnel; (3) Proper shut down of the affected systems at each machine location; (4) Disconnection of all primary energy sources; (5) Address, disconnect, or lock all secondary sources of hazardous energy; (6) Verify the lockout of all hazardous energy sources of the machine; (7) Ensure continuity between personnel shifts and other changes until the repair is finalized; and/or (8) All affected parties provide their keys to authorize bringing the equipment back online. In some embodiments, a procedure or system implementing or facilitating the procedure may omit some steps, require additional steps, and/or implement steps in an alternative order or more than once. The systems and methods described herein may be customized and adapted for a particular industry, workplace, legal jurisdiction, equipment or machine types, insurance mandates, warranty rules, maintenance procedures, or the like.

Lockout-tagout procedures can include instructions for an operator or mechanic to lockout a broken or unsafe machine for repair or maintenance. For example, an operator may notice a large amount of oil leaking from under a machine during normal operations. The specific lockout-tagout procedures for the particular machine may dictate that the operator immediately discontinue use of the machine, lock a particular lever to prevent further operation of the machine, and/or notify his or her supervisor. The supervisor may review the lockout to determine whether any additional machine locations require lockout. For example, in addition to locking the lever, the affected machine may require lockout of an electrical circuit breaker. The supervisor may then place a lock on the lever (in addition to the lock placed by the operator) and also place a lock on the electrical circuit breaker. The supervisor may also notify the operator to place his or her lock on the electrical circuit breaker. The lockout process may require any number of affected users (operators, repair technicians, supervisors, etc.) to place one or more locks on the machine in one or more lockout locations. Each individual unlocks and removes his or her lock before the machine can be returned to regular operation.

In many instances, certain documentation and/or records must be completed prior to servicing. The systems described herein may facilitate digital record keeping and provide electronic notifications. For example, a supervisor or operator may notify an authorized user (e.g., a repair technician) to request an authorized repair on the machine. Such a notification may be transmitted electronically, and records may be stored in a centralized electronic database. Prior to performing any repairs, the authorized user places yet another lock on the machine's lever and electrical circuit breaker. For the safety of the authorized user, the machine must not operate while performing the necessary repairs. For example, if the operator uses the machine while the authorized user is replacing the oil and fixing the leak, hazardous energy may harm or kill the authorized user. The authorized user may need to pass the completed repair through his or her "lead," an authorized user in charge (e.g., a lead repair technician), who certifies that the authorized user has authority to perform the repair and/or that the authorized user has completed the repair correctly. A centralized personnel database may facilitate automatic or manual verification of user-authorization levels.

Each operator, authorized user, supervisor, and any other person potentially affected by the hazardous energy of the machine may place a separate and distinct lock with separate, unique keys. At times, the affected individuals may become confused about which lock belongs to which individual. Determining whose lock is on a machine can delay the return to normal operations. For example, if an employee leaves the company, the required key may become lost. A keyholder may work a different shift, travel, be on parental leave, and/or otherwise be unavailable to open the lock despite completion of the authorized repair. In such cases, a manager or employee with "bolt-cutter authority" is authorized to cut the lock (e.g., with physical bolt cutters) to restore normal operations. The delay and paperwork associated with proper lockout-tagout authorized repairs may cause some operators and authorized users (repair technicians) to simply skip the formal procedure and repair, perform maintenance on, or conduct an inspection of the machine in an unsafe manner.

The presently described systems, devices, and methods include a multi-keyholder network-enabled lock that allows a user to add additional keyholders that can each "lock" a device and "unlock" the electronic lock with their own digital key. A physical lock can be placed on a lockout location of a machine. A first keyholder (e.g., an operator who detected a malfunction) may electronically lock the physical lock to prevent removal thereof. A second keyholder (e.g., a supervisor or repair person) may electronically lock the physical lock to further prevent removal thereof. Any number of individual keyholders may electronically lock the same physical lock. The physical lock placed on the lockout location of a machine may prevent operation of the machine until it is removed. The physical lock cannot be removed until each keyholder unlocks the electronic lock, or, as described below, an electronic bolt-cutting action is taken to forcefully remove keyholders from the electronic lock.

Thus, until all individuals have approved an unlock action using their digital keys, the physical locking device remains locked and in place. In some embodiments, users can add other affected parties (e.g., authorized users, supervisors, and/or authorized users in charge) as keyholders to, for example, a Bluetooth-enabled lock. For the lock to open, all keyholders must remove themselves as keyholders from the Bluetooth lock. In some embodiments, an operator may manually add additional keyholders to the group. In some embodiments, the machine or machine location may store a list of default keyholders for a lockout procedure to enable an authorized repair and auto-populate required or suggested keyholders. Each party may only unlock the device with his or her individual key, and all keyholders must approve the completion of the work by removing themselves as active keyholders prior to unlocking the device. As such, an operator may add an authorized user to the lock but cannot remove the authorized user once added. In some embodiments, all users in a hierarchy of authority may be authorized to add other users as keyholders, but are only allowed to remove other users as keyholders that are beneath them in the hierarchy of authority.

In many embodiments, a lockout-tagout process may start with the observation of a defect (e.g., by the operator) or required scheduled maintenance. An authorized user may repair or perform maintenance on a machine capable of imparting hazardous energy that may injure or kill the authorized user. The operator and/or the authorized user may begin the lockout process by scanning machine-identifying information. For example, a machine may include a QR code, a serial number, or another identifying marker attached to, or near, the machine. The user may input the identifying marker and receive instructions for locking out the machine with one or more physical locking devices. The user may add himself or herself as a keyholder and, in some embodiments, any number of additional keyholders. In some embodiments, the system may identify and auto-populate default keyholders (e.g., optional or necessary keyholders for the specific machine) in response to an input of a single identifying marker of a machine.

For example, an operator, "Bob," may notice that a machine is vibrating abnormally. Bob may use a dedicated mobile device or his or her own personal mobile device to scan a QR code associated with the machine. The system may provide Bob, via the mobile device, instructions on how to lockout the machine using a padlock or other locking device. Bob may physically place the padlock to lockout the machine and prevent it from being operated. The padlock may be electronically controlled and in communication with the mobile device (e.g., via Bluetooth or another communication or networking protocol). Bob may use a mobile application on the mobile device to add himself as a keyholder to the physical padlock. Until Bob unlocks the physical padlock by removing himself as a keyholder, the machine may not be operated (unless a digital bolt-cutting operation occurs, as described below). In some embodiments, Bob may add, or the system may automatically add, Bob's supervisor, "Jim," or another individual, as a keyholder.

The lockout management system may automatically send Jim a notification requesting a visual and/or more comprehensive inspection of the machine and the correctness of the lockout procedure. Jim may add two authorized users ("Steve" and "Dave") as keyholders, or request that they add themselves upon accepting responsibility for handing repairs. Steve and Dave may be, for example, repair technicians. Finally, any of these users and/or the system may automatically add "Toby" as a keyholder, where Toby is the authorized user in charge. Toby may ultimately be responsible for ensuring proper lockout-tagout procedures are followed and documented (e.g., via mobile applications in communication with the lockout management system) and/or to inspect completed repairs before authorizing the machine to be operated again.

"Charles," a safety manager, may have bolt-cutting authority and be added as a keyholder as well. Bolt-cutting authority is the authority to override a lock. Bolt-cutting authority may be granted to any number of users associated with the system. In some embodiments, an electronic locking system or an electronic lock itself may request more than one user to authorize a bolt-cutting override. For example, Charles may initiate a bolt-cutting operation to release the padlock and the system may notify and request that Toby confirm the operation. Once all the keyholders have individually removed themselves as keyholders and/or a bolt-cutting operation is executed, the padlock may be removed from the machine to enable operation thereof.

Because the padlock is network-enabled, each of the keyholders may use a dedicated mobile device, a centralized electronic device, and/or personal mobile devices to add themselves as keyholders, add notes, add documentation regarding the lockout, upload pictures, receive notifications, monitor lockout status, and/or remove themselves as keyholders. In various embodiments, the lockout management system may require some users to take photographs verifying correct placement of padlocks (or other locking devices) when adding themselves as keyholders. Similarly, the system may require that some users (e.g., based on their role in the lockout process) be physically proximate the padlock before removing themselves as keyholders, while other users may remove themselves as keyholders from remote locations.

When scanning a QR code or other identifying information, the lockout management system may provide instructions identifying multiple lockout locations for a single machine or group of related machines to prevent the unwanted release of hazardous energy. Sources of hazardous energy include, for example, mechanical energy, electrical energy, hydraulic/pneumatic energy, and other high-energy systems associated with the machine. The machine location may identify a list of all the keyholders that should be, will be, can be, and/or are by default associated with, for example, a Bluetooth lock used to lockout each machine lockout location. For example, an electrical breaker may require a lock to prevent operation of a vibrating machine. As another example, the machine may require a lock on a mechanical lever.

The lockout management system may provide instructions via a graphical user interface ("GUI") on a mobile application on an electronic device (e.g., on a mobile phone, tablet, laptop, or Human Interface Device of the machine itself). In the example above, the GUI may guide Bob through the various machine locations for a proper lockout. Additionally or alternatively, Bob may specify the locations at which he placed locking devices to lockout the machine, describe such locations with text, videos, or images, and/or confirm placement of locking devices in marked locations on the machine. In various embodiments, the system may provide specific instructions, including pictures, audio, or videos, regarding the steps Bob must take to lock down that location of the identified machine. In some embodiments, the lockout system may connect Bob to a supervisor or safety manager if Bob has questions or is unsure how to proceed. The lockout system may automatically connect Bob to, or otherwise alert or notify, an on-duty supervisor or safety manager responsible for the specific machine.

The system may also notify authorized users (e.g., repair technicians) of the addition of their names as keyholders on the machine. In some embodiments, users who are automatically added and/or added by other users as keyholders may only be preliminarily added as keyholders until they confirm their keyholder status. In some embodiments, a lock may be unlocked and removed only when preliminary keyholders release their keyholder status. In other embodiments, a lock may be unlocked or removed even if preliminary keyholders have not responded to confirm or deny their status as keyholders. The lockout management system may send updates and/or requests for attention to keyholders once, hourly, daily, weekly, monthly, or on demand as status changes occur.

Keyholders may be added to the lock before placement or after placement. In some embodiments, some locks may have default keyholders added automatically whenever, for example, the shackle of a padlock is closed. In such embodiments, the shackle cannot be released until the keyholder or keyholders remove themselves as keyholders and/or otherwise authorize the lock to be unlocked. The system may provide specific instructions on how to open and place the lock at the desired location. Upon completion of the lock placement, the lockout management system may require the operator to confirm or certify placement of the lock. The confirmation or certification of completion of the lockout (or portion of a lockout) may be performed in a manner to satisfy legal or regulatory requirements and/or to provide useful documentation for other purposes, such as warranty requirements or to maintain maintenance records.

The lockout management system may require the operator (or another user) locking the machine to provide a summary before or after the lock is placed. The summary may provide notes, observations, attempted methods to safely repair, or proposed repairs for the machine. The summary may state the required timeline for the repairs; for example, the summary may indicate how urgently the operator needs the machine. The system may request, in the summary section, specific comments on the problem and any perceived causes or repairs required.

Once the lockout is complete and the user has provided a summary, the system may ask for another QR code (e.g., for another machine location). The QR code may define another affected machine (e.g., downstream of the original machine), or may define another machine location of the same machine. For example, a single machine's lockout procedure may require a lock at the hydraulic line, multiple locks on mechanical levers, and/or locks on one or more electrical breakers. The QR code may be specific to the machine and/or location(s). In some embodiments, when the operator scans a QR code, the machine and location fields may auto-populate.

Once an operator has completed a request for repair and has added necessary keyholders, an authorized user (who is one of the keyholders) may begin the repairs. The authorized user may confirm that he or she is a keyholder on each of the locks on the machine to confirm that repairs can be safely made. Because only the authorized user can remove himself or herself as a keyholder on the various locks, the authorized user can be confident that no other person will accidentally engage or initiate the machine while he or she is working on the machine.

Upon completion of the repair, the authorized user (or authorized user in charge) may describe any work performed in the work description section of the GUI. In some embodiments, the authorized user cannot complete the authorization (and subsequent removal of himself as a keyholder) until he or she uploads a photo of the completed repair. The system can store and organize these inputs as a complete record or file (e.g., for OSHA audits). The real-time documentation relays information over the network to all affected parties. The real-time information reduces errors, decreases repair time, and allows for documentation that is more efficient. Upon submission of all the necessary documentation, the authorized user may digitally unlock his or her key.

For example, Steve and Dave (authorized users) can remove their keys upon successful completion of the repair. In some embodiments, Steve, Dave, or the lockout management system itself may notify (e.g., either manually or automatically) Toby to certify the repair. Upon inspection, Toby, the authorized user in charge, may remove himself as a keyholder from the lock(s) and notify operator Bob. The system (e.g., via a messaging system, SMS message, page, email, call, etc.) may notify Bob's supervisor, Jim, and the authorized "bolt-cutter," Charles, that Toby has removed himself as a keyholder and has authorized the machine to be brought online. Bob may then approve/unlock the device through his digital key remotely over a network connection or via close-proximity Bluetooth. His supervisor, Jim, may approve once he reviews the lockout procedure and confirms that Bob unlocked his device.

It is possible that one keyholder may not be available to remove himself or herself as a keyholder. Charles may use his bolt-cutter authority to approve the repair for anyone unable to unlock their device. When all other keyholders approve/unlock the device, Charles may review the notes, summaries, histories, etc. and determine that the remaining keyholders are not necessary keyholders and may be simply removed via his bolt-cutter authority. Charles may review the documentation and unlock the physical locking device. In some embodiments, the lockout management system may notify or warn keyholders that their status as a keyholder on the lock (or locks) has been "cut."

One feature of the systems and methods described herein is that a user can add multiple, specific authorized keyholders to the lock, but that same user may not be able to unilaterally remove those same keyholders from the lock. In various embodiments, aside from managers or other entities with bolt-cutter authority, each named individual is the only person that can remove himself or herself as a keyholder. Each individual may, for example, be the only person in possession of their unique digital key. The digital key may be, for example, a PIN number, a password, a blockchain-based identifier, a username, a digital code, a device-based code (e.g., an RFID or NFC code), and/or another authorization credential. Accordingly, each person added to the locking device is required to input their digital key to unlock the device. In addition, the ability to complete all the "paperwork" and add keyholders electronically reduces the hardware, paperwork, and coordination ordinarily required to lock and unlock the device.

In some circumstances, a person may not have physical access to an electronic locking device to remove himself or herself as a keyholder, such as after a repair is approved. For example, Jim, the supervisor of operator Bob, may travel to another worksite. While away, Jim may not be available connect to the device via Bluetooth to remove himself as a keyholder. Bob may call Jim and request him to unlock the device and/or send an electronic request via the application. Jim can open his mobile application, obtain a passcode or PIN (e.g., a single-use passcode) and supply the PIN/passcode to Bob via an out-of-band communication (e.g., text message, phone call, email, etc.) or via the application. Bob can then enter the PIN/passcode and unlock the device on Jim's behalf. The system may document a record of the creation of the passcode by Jim and the entering of the passcode by Bob. In other embodiments, remote access via a wide-area network may be possible to enable Jim to remotely unlock the device himself via a desktop, server-based, or mobile application.

The lockout management system may enable real-time monitoring of lockout procedures. A manager or supervisor may have an interest in monitoring the operation of his or her machines and ensuring that any lockouts comply with OSHA requirements, company policies, and/or other established practices. The system may identify completed lockouts and partial lockouts. "Completed" lockouts comply with OSHA or other regulatory standards, company policies, industry standards, or the like, and have all required documentation and locks confirmed in place. "Partial" lockouts indicate that the process is incomplete. A partial lockout may clearly identify a machine or equipment that has a problem (e.g., needs repairs), but that not all locks are in place or the lockout does not conform to OSHA or other industry, company, or regulatory requirements. The system gives real-time information for monitoring capabilities on the operation and safety of the system.

Keyholders may have varying levels of access to the system and may add notes, look at the lockout steps, and/or add additional keyholders (e.g., affected parties). In addition, tag/ticket numbers may be associated with photos to help identify the problem and any repairs. Keyholders may have a specific screen (GUI) in a native or web-based application to authorize and unlock their digital key.

In some embodiments, users may utilize a desktop application or web-based application in addition to or instead of a mobile device application. With proper login credentials, a user may perform all the features described herein. In some embodiments, additional information, setup options, customization options, and/or other advanced features may be available via a desktop or server-based application. Once logged into the desktop system, a user may select different types of machines based on model number, identification number, serial number, model number, manufacturer, name, or other selectable attributes. The user may use the application to set up the lockout procedures, required lock locations, required confirmations, default keyholders, and/or other configuration or operational settings. For example, a specific type of machine may be configured to require an electrical system lock, a chemical system lock, a hydraulic system lock, a pneumatic system lock, a mechanical system lock, a residual system lock, and a pressurized system lock.

The user can view different machines to determine machine attributes and locks required to lockout the machine. For example, the lock on a mechanical system may have different requirements than the lock on a hydraulic system. The desktop application may identify a series of machines of the same type with different identifiers, serial numbers, or other identifying features. The system may enable a user to search past issues with the type of machine to determine previous processes followed. The desktop application may also indicate whether a machine of interest is active or inactive (e.g., in operation or not). The desktop application may also indicate any potential users, operators, authorized users, authorized users in charge, supervisors, managers, or other affected personnel.

The desktop application may enable queries on network-enabled locks and their status (e.g., locked or unlocked, assigned to a specific user, assigned to a specific machine, currently in use as part of a lockout, available for assignment, etc.). The user may search locks by name, MAC address, status, or other identifying features. The results enable further inquiry into, setup of, customization of, and/or deletion of each lock.

Not all machines and equipment can be fully "locked out." For example, some machines may not be rendered safe by simply applying locks at various locations. Tagout procedures may be used to provide notice of the problem. Operators and authorized users may utilize tagout procedures alone (i.e., without a lockout procedure) when a machine is not capable of being physically locked. Instead, a "tag" attached to the machine warns affected users of potential danger. A person with ordinary skill in the art would recognize that the same lockout procedures described above would apply to a tagout procedure, but with a warning tag instead of a physical lock. For example, the lockout management system may be aptly referred to as a lockout-tagout management system, as the system may also be capable of enabling, instructing, managing, monitoring, and documenting a tagout procedure that complies with OSHA or other regulatory requirements, company policies, industry standards, established best practices, or the like. Instead of a physical lock, a network-enabled device can track the approval of all necessary keyholders.

This disclosure also describes various systems and methods that allow a user to unlock the lock by providing a pattern of inputs via an input device associated with the lock. For example, a pattern of long and short touch inputs can be used to actuate the lock (i.e., lock or unlock the locking mechanism). This application also describes various systems and methods for powering, jump-starting, and charging a wireless-enabled interchangeable locking core.

The following description includes specific details and examples in the context of the drawings. The principles of this disclosure apply to a wide variety of locks, security systems, standardized locking systems, and proprietary locking systems that allow for multi-keyholder electronic locks. Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment. Networks and wireless communication generally encompass a wide range of electromagnetic radiation communication frequency bands, modulation protocols, encoding, encrypting, communication protocols, and hardware protocols.

Examples of suitable protocols and technologies include, but are not limited to, 802.xx protocols (e.g., Wi-Fi), Bluetooth protocols, near-field communication (NFC) protocols, radio frequency identification (RFID) protocols, Zig-Bee, Z-wave, BACnet, 6LoWPAN, RPL, CoAP, cellular protocols (e.g., 4G LTE or 5G), Thread, Sigfox, Neul, LoRaWAN, and/or various protocols using the ISM bands in the U.S., SRD bands in Europe, and the like in other jurisdictions.

Related networks may also include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism. In some embodiments, virtual networks and software-defined networks may be utilized.

Aspects of certain embodiments described herein, including the various subsystems described herein, may be implemented as software modules, hardware modules, and/or a combination thereof. As used herein, a software module or component may include any type of computer instruction or computer-executable code located within or on a computer-readable storage medium, such as a non-transitory computer-readable medium. A software module may, for instance, include one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIGS. 1-11, described in greater detail below, are examples of electronic locking devices that can be used, configured, programmed, or modified to function as multi-keyholder (i.e., multi-user) electronic locks. Any of these lock formats and device types, as well as many other form factors and lock types, can be configured as wireless-enabled electronic locks that facilitate multi-keyholder functionality.

Accordingly, any of the described locks can be utilized by a lockout management system to enable multiple keyholders to lock a device as part of a lockout procedure. While many variations of lockout management systems and methods are described above in detail, FIGS. 12-30 illustrate additional specific examples of lockout management systems and methods.

FIG. 1 illustrates a wireless-enabled interchangeable locking core 100 compatible with the small format interchangeable core (SFIC) standard, according to one embodiment. The SFIC core standard specifies, among other things, a specific size and shape to fit within a core receptacle of an SFIC lock assembly. Other interchangeable locking cores may have different specifications to fit within core receptacles of generic or proprietary lock assembly configurations.

Internal components of the illustrated wireless-enabled interchangeable locking core 100 are contained within outer housing 110 along with a front cover 112 and a rear cover 114. One or more latches 115 may connect the rear cover 114 to the outer housing 110. In various embodiments, two or more components described herein as distinct components may be combined as a single component. For example, one or more of housing 110, front cover 112, and rear cover 114 may be combined as a single casing component. Similarly, many of the components described herein may be separated into a plurality of sub-components while retaining similar or identical functionality. Combining some components may allow for the omission of other components. For example, in an embodiment in which the outer housing 110 and the rear cover 114 are formed as a single component, latches 115 may be omitted.

In some embodiments, a relatively large handle 121 may extend from the front cover 112 of the wireless-enabled interchangeable locking core 100. In other embodiments, the handle 121 may be reduced in size and/or have any of a wide variety of shapes and sizes. The handle 121, regardless of shape, size, or configuration, is externally accessible to an operator to allow the operator to rotate an inner lock core (shown as element 225 in FIGS. 2, 3, and 5) when the locking core 100 is in a released state. The inner lock core may not be rotated by the handle 121 when the inner lock core is in a secured or locked state.

As used herein in the context of the locking core 100, the phrase "released state" refers to the state of the locking core 100 with respect to an associated locking mechanism (e.g., a deadbolt). Specifically, with the locking core 100 in a released state, the locking core 100 is both engaged with the locking mechanism and an inner lock core is allowed to rotate. Thus, with the locking core 100 in the released state, the handle 121 may be used to rotate the inner lock core that is mechanically coupled to the locking mechanism in such a manner to cause the locking mechanism to be unlocked.

As used herein in the context of the locking core 100, the phrase "secured state" refers to the state of the inner lock core with respect to the locking mechanism as being mechanically disengaged from the locking mechanism, the handle 121 being mechanically disengaged from the inner lock core, the handle 121 being prevented from rotating, and/or the inner lock core being prevented from rotating. Similar contextual understanding of "secured" or "locked" states can be understood as different than the "unsecured" or "unlocked" states for other types of locking devices, such as padlocks. Regardless of which approach is used, the locking core 100 is described as being in the secured state since the handle 121 cannot be used to unlock the locking mechanism. Thus, transitioning the locking core 100 from the secured state to the released state may include one or more of engaging the inner lock core with a locking mechanism, allowing the inner lock core to be rotated, allowing the handle to be rotated, and/or engaging the handle 121 with the inner lock core.

The handle 121 may be connected to a shaft of a motor holder (not visible in FIG. 1). A logo, instructional marking, or identifier may be located on a button cap 118, front cover 112, and/or the handle 121. A logo 119 is illustrated on one face of the handle 121.

In various embodiments, the handle 121 may rotate (e.g., be rotated by an operator or an electric motor) when locking or unlocking. The button cap 118 may be used as a button to turn on the lock, turn off the lock, and/or as an input device for providing a touch pattern (quick-click pattern) to actuate the lock. In some embodiments, the button cap 118 activates a power source for a predetermined amount of time. Once activated, the wireless-enabled interchangeable locking core 100 may "listen" for wireless signals to actuate a motor within the lock (e.g., a stepper motor or a DC motor) and/or listen for a quick-click input for similar functionality.

To conserve power, the lock may remain in a low-power or even a no-power state (referred to herein as an "idle state") until activated (e.g., by pushing the button cap 118). In some embodiments, the lock may instead or additionally be activated based on a received signal (e.g., RFID, NFC, Bluetooth, etc.). The signal may induce sufficient current in, for example, a coil to provide a "wake up" signal to activate the lock and cause it to listen for an actuation signal. In some embodiments, the lock may remain in a low-power state to listen for actuation signals, and thus not require the button cap 118 for activation. In some embodiments, the functionality of the button cap (according to any of the embodiments described herein) 118 may be integrated into the handle 121. When a locking core wakes up it may transmit a lower-power beacon and an authorized Bluetooth mobile device may respond by providing authentication credentials.

In some embodiments, a user may lock the electronic lock when the electronic lock is offline, but may not unlock the lock when the electronic lock is offline. Once the lock establishes a connection, the lock actuation performed while the lock was offline uploads its status (i.e., locked) to the server. In some embodiments, unlocking the lock is prohibited when the lock is not connected to the server. In some embodiments, authentication of unlock attempts made by users are exclusively allowed through servers. In some embodiments, each interaction with the lock is recorded. In some embodiments, the lock explicitly excludes quick-click and/or fob functionality. In some embodiments, a lock may be selectively disabled for the entire system. In some embodiments, quick-click, fob, and/or other offline functionality may be selectively disabled when the lock is utilized in conjunction with devices having higher danger levels and enabled when utilized in conjunction with devices of lower danger levels.

In some embodiments, button cap 118 may be used to actuate the lock. That is, the button cap 118 may be pushed to lock and/or unlock the lock. It is appreciated that the functionality of a button can be replaced with any of a wide variety of technologies, including switches, toggles, capacitive touch inputs, resistive touch inputs, light sensors, motions sensors, accelerometers, slide contacts, and the like.

Figure 2:
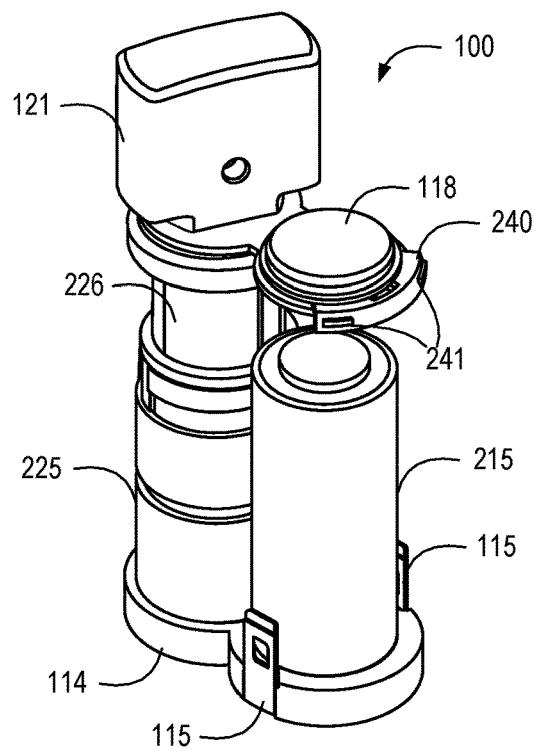
FIG. 2 illustrates the wireless-enabled interchangeable locking core of FIG. 1 with the outer housing and cover removed, according to one embodiment.

FIG. 2 illustrates the wireless-enabled interchangeable locking core 100 of FIG. 1 with the outer housing 110 (FIG. 1) and the housing cover 112 (FIG. 1) removed. As illustrated, internal components of the wireless-enabled interchangeable locking core 100 may include a power supply 215 and a lock core 225. A motor holder 226 may have a shaft (not shown) to which the handle 121 is connected. Status lights 241 may be part of a lighting system 240 to provide status indications.

The power supply 215 may be a battery that can be recharged and/or replaced when it loses charge. Alternatively, a supercapacitor may be used. In some embodiments, the power supply 215 (shown as a single cylinder) may include a battery and/or capacitor along with charging components. For example, in one embodiment, contacts may extend from charging components of the power supply 215 to an external port. In one embodiment, a charging port is located underneath the button cap 118. In another embodiment, a charging port extends through the button cap 118. In still other embodiments, a charging port is positioned proximate the button cap 118 and the lighting system 240.

In some embodiments, no port is available, but two prongs are provided to allow a chip or disk battery (e.g., CR2032) to be used to "jump-start" the interchangeable locking core 100. The jump-start prongs may be positioned proximate the handle 121, on the handle 121, proximate the button cap 118, or under the button cap 118.

In one embodiment, the power supply 215 includes a wireless charging interface (e.g., via inductive charging or an RF-to-DC converter) that allows for a battery or capacitor to be wireless charged. In still other embodiments, the button cap 118, lighting assembly 240 and/or other components may be removed without unlocking the lock to allow for a battery to be replaced. In one embodiment, the lock provides a warning that a battery is low and replacement of the battery is only possible by unlocking the lock using the remaining charge in the nearly depleted battery.

Figure 3:
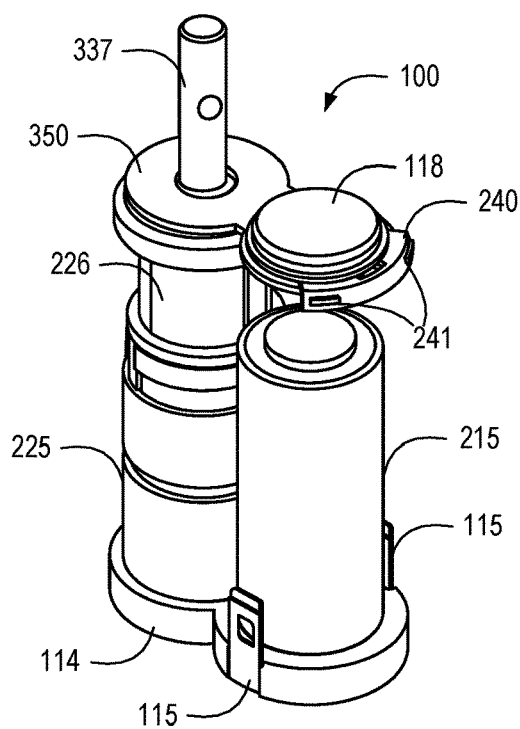
FIG. 3 illustrates the wireless-enabled interchangeable locking core of FIG. 2 with the handle removed to expose the motor shaft, according to one embodiment.

FIG. 3 illustrates the wireless-enabled interchangeable locking core 100 of FIG. 2 with the handle 121 (FIG. 2) removed to expose the motor shaft 337 of the motor holder 226, according to one embodiment. The shaft 337 and/or the handle 121 (FIG. 2) may have apertures to accommodate fasteners, grooves, protrusions, and/or the like to facilitate rotationally coupling the shaft 337 to the handle 121 (FIG. 2). A control printed circuit board (PCB) 350 may have an aperture for the shaft 337 to pass through. In alternative embodiments, the control PCB 350 may be formed as a split ring to allow the shaft 337 to pass through the split. In still other embodiments, the control PCB 350 may be formed smaller and/or not positioned proximate or around the shaft 337. A spacer PCB 552 (FIG. 5) may separate the control PCB 350 from the top surface of the motor holder 226. Spring contacts 551 (FIG. 5) may facilitate electrical connections from the control PCB 350.

The control PCB 350 may include a processor, microprocessor, field-programmable gate array (FPGA), and/or various hardware circuitry. For example, the control PCB may include a custom application specific integrated circuit (ASIC), memory, and/or various input terminals and output terminals. As discussed above, the control PCB 350 may remain in an idle state (e.g., low-power or no-power state) until the lock is activated (e.g., via button cap 118). The control PCB 350 may be configured to receive a Bluetooth signal (or another wireless signal such as NFC, RFID, etc.). The Bluetooth signal may be encrypted and/or include an instruction to unlock the lock and/or allow the lock to be unlocked.

Thus, the control PCB 350 may be described as an electronic controller that includes a wireless receiver (e.g., a Bluetooth module, NFC module, etc.), an input detector, an authorization controller, a locking state controller, a memory, processing abilities, communication modules, and/or various hardware circuitry. In various embodiments, the control PCB 350 may compare, via an authorization controller, authorization credentials received via a wireless receiver, with authorization credentials stored in a memory. Such authorization credentials may be in the form of exact-match data, cryptographic hashes, public/private keys, encrypted communications, commands, and/or the like.

In some embodiments, the control PCB 350 may not have or utilize memory and processing power to validate authorization credentials. Rather, the authorization controller may include a communication module to confirm with a remote processor (e.g., a cloud service) that the received authorization credentials are valid.

The control PCB 350 may include an input detector to confirm that a received pattern of physical input interactions matches a sequence stored in local memory and/or in cloud-based memory. The control PCB 350 may then utilize a locking state controller to transition the locking core 100 from the secured state to the released state. For example, upon validation of either the authorization credentials or the input pattern of interactions with the electronic sensor, a motor, such as a stepper motor or a DC motor, may rotate to transition the locking core 100 to the released state.

One or more of the locking state controller, authorization controller, input detector, wireless receiver, idle/active state controller, memory, processors, and/or other electronic components may be combined as a single component or as a set of connected components that share one or more resources (referred to generally as an electronic controller).

In some embodiments, the lock may have been previously paired with a Bluetooth-enabled mobile device. When the paired Bluetooth-enabled mobile device is within range of the lock, the paired Bluetooth-enabled mobile device may transmit an unlock signal. Once the lock is activated (if it is in an idle state), it will receive the unlock signal from the paired Bluetooth-enabled mobile device. In some embodiments, a lock may be pre-paired or may not require conventional pairing with a Bluetooth-enabled mobile device. For example, one or more keycards or fobs (also known as key fobs) may be utilized with the wireless-enabled locking core 100 that do not require pairing.

The handle 121 (FIG. 2) may then be used to rotate the shaft 337 and unlock the lock. Absent an unlock signal, a stepper motor (or another motor) of the lock may not be actuated and the handle 121 (FIG. 2) may be prevented from rotating the shaft 337. Similar functionality may be adapted for devices and locks utilizing NFC, RFID, 6LoWPAN, ZigBee, etc. Status lights 241 in the lighting system 240 may provide feedback regarding the status of the lock. For example, a red light may be displayed when a lock cannot be actuated. A green light may be displayed when a lock has successfully received an unlock signal to cause the stepper motor to rotate. Combinations of colors, flashing patterns, and the like may be used to indicate a pairing mode, actuation, failed actuations, battery status, and/or the like.

Figure 4:
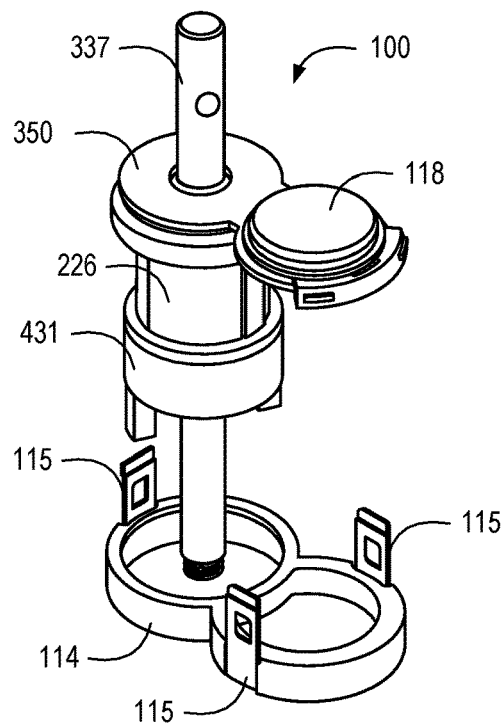
FIG. 4 illustrates the wireless-enabled interchangeable locking core of FIG. 3 with the power supply removed, according to one embodiment.
Figure 5:
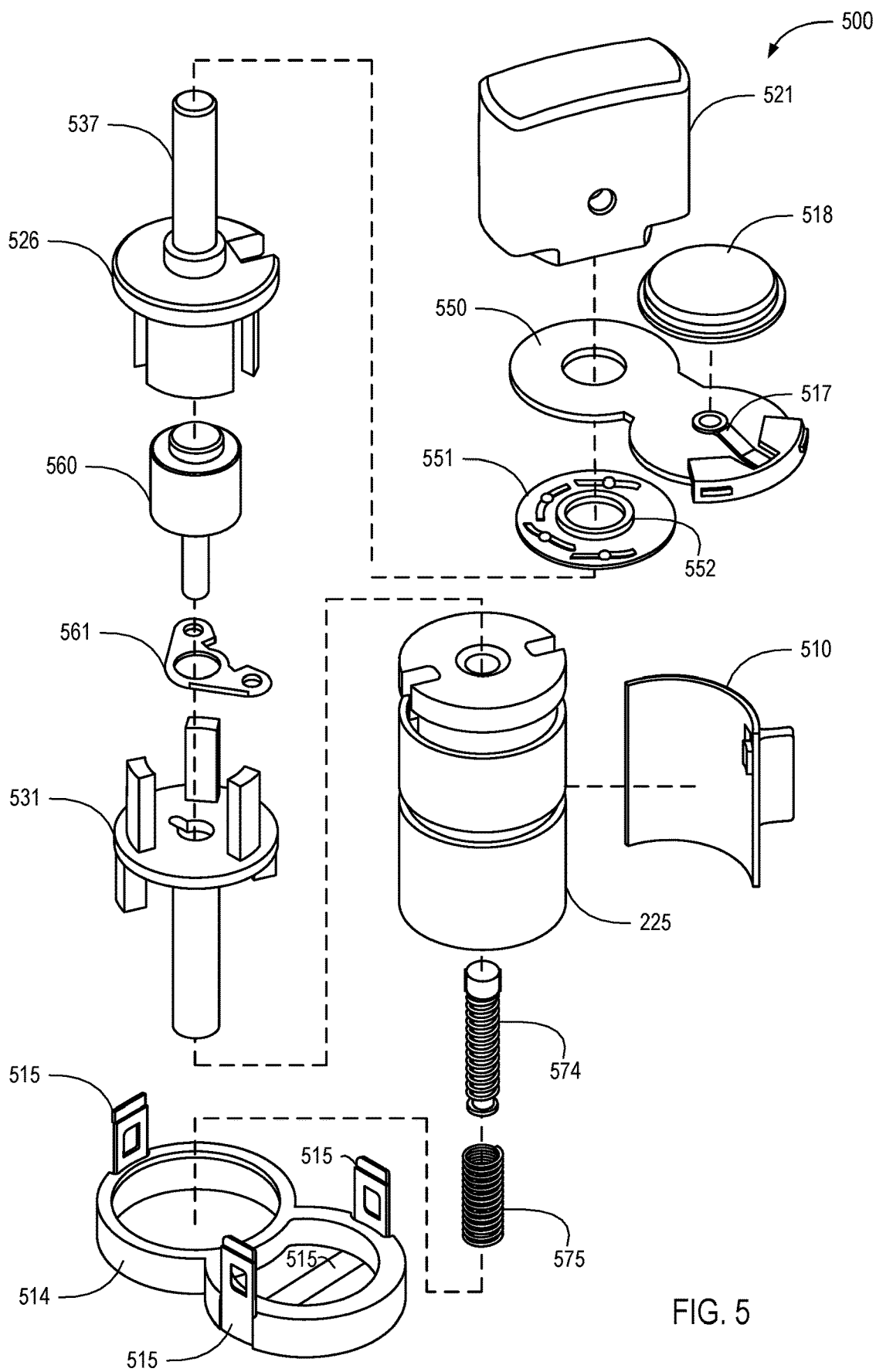
FIG. 5 illustrates an exploded view of various components of a wireless-enabled interchangeable locking core, according to various embodiments.

FIG. 4 illustrates the wireless-enabled interchangeable locking core 100 of FIG. 3 with the power supply 215 (FIG. 3) and the lock core 225 (FIG. 3) removed, according to one embodiment. In FIG. 4, the three latches 115 are shown as independent latches. In contrast, two of the latches 115 in FIG. 5 are shown connected with a rear cover support. With the lock core 225 (FIG. 3) removed, the key 431 can be seen with interlock arms extending up into the motor holder 226 and down into the lock core 225 (FIG. 3). Moreover, the three latches 115 are shown that secure the rear cover 114 to the outer housing 110 (FIG. 1).

Multiple elements that are standard or commonly employed in electrical and mechanical designs are not illustrated to avoid confusion. For example, battery contacts (e.g., wires or metal strips) to connect the battery to the control PCB 350 are not illustrated. Similarly, various spacers, insulators, contacts, and springs are not illustrated to more clearly illustrate the other components of the wireless-enabled interchangeable locking core 100.

FIG. 5 illustrates an exploded view of various components of a wireless-enabled interchangeable locking core 500, according to various embodiments. A rear cover 514 may be secured to an outer housing (not shown) via one or more latches 515. A lock core 225 may fit within the rear housing. A control tab 510 may be positioned around a portion of the lock core 225. In some embodiments, the control tab 510 may be biased by a leaf spring (not shown). The control tab 510 allows the wireless-enabled interchangeable locking core to be removed from a core receptacle of a lock assembly.

In various embodiments, the control tab 510 may be controlled via an application using master login credentials. For example, an application interface may include a "replace locking core" option that engages the control tab 510. With the control tab 510 engaged, the locking core can be removed from a lock assembly. For instance, once the control tab 510 is engaged, the handle 521 may be rotated a preset amount (e.g., 15 degrees). The handle 521 may then be grasped and used to pull the wireless-enabled interchangeable locking core out of the core receptacle of a lock assembly.

A lower shaft of the key 531 may be inserted into the lock core 225 and accommodate a first compression spring 574 and a return compression spring 575. In some embodiments, the springs 574 and 575 may facilitate the selective engagement of the locking core 225 with one or more rear-engagement pins of a lock assembly (e.g., rear engagement pins 707 in FIG. 7A). For example, the springs 574 and 575 may bias the lock core to disengage the lock core 225 from the lock assembly until a user is authenticated.

The shaft of a stepper motor 560 may pass through a mount 561. The stepper motor 560 may sit within upward-extending interlock arms of the key 531. The downward-extending interlock arms of the motor holder 526 may interface with the upward-extending interlock arms of the key 531.

Spring contacts 551 may be positioned on a plate (as illustrated) or may be formed directly on the upper surface of the motor holder 526 to obviate the need for the plate. Though not illustrated, the motor holder 526 may include one or more apertures or thru-bores to facilitate electrical connections from the control PCB 550, via the spring contacts 551, to other components of the wireless-enabled interchangeable locking core 500. In the illustrated embodiment, the control PCB 550 has an aperture through which the shaft 537 of the motor holder 526 passes. A button contact 517 may provide electrical contact between the button cap 518 and the control PCB 550. Finally, the handle 521 may be secured to the shaft 537.

The various wireless-enabled interchangeable locking cores described in FIGS. 1-5 can be programmed or otherwise configured, by themselves and/or in conjunction with a supporting server infrastructure, mobile applications, desktop applications, etc. to facilitate multiple keyholders. Thus, any of the variously described wireless-enabled interchangeable locking cores may be installed in a receiver associated with a lockout location of a machine. For example, some machines may include a receiver to receive a wireless-enabled interchangeable locking core. In other examples, a machine may be locked within a room or other enclosure that can receive an interchangeable locking core. In these and other embodiments, the lockout management system may facilitate a multi-keyholder lockout of the wireless-enabled interchangeable locking core.

Figure 6:
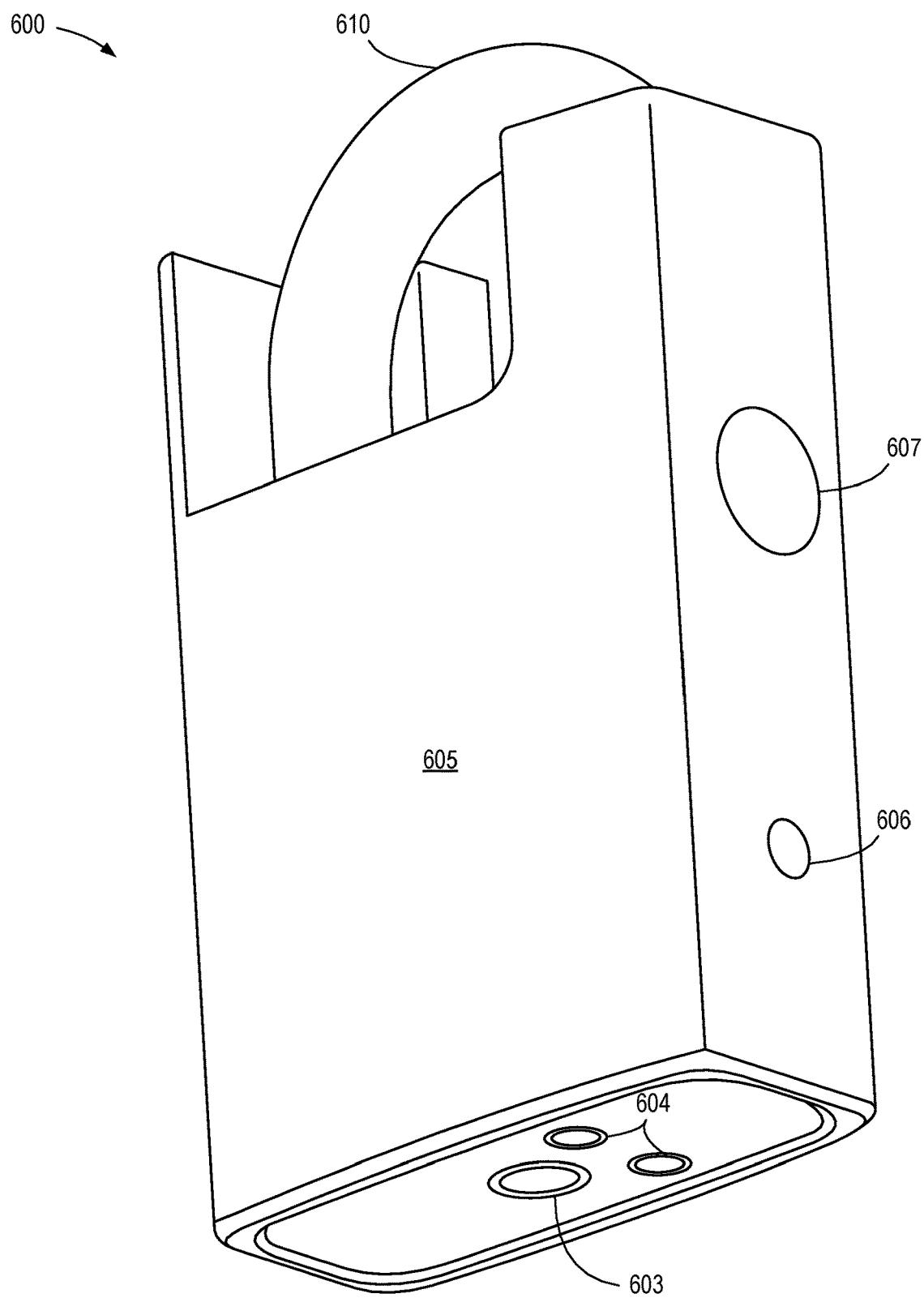
FIG. 6 illustrates a keyless electronic lock with a removable shackle and a touch input sensor, according to one embodiment.

FIG. 6 illustrates a keyless electronic lock 600 with a removable shackle 610. The removable shackle 610 is partly shrouded by shackle shroud of a lock body 605. A weep or access hole 607 allows moisture and/or debris to escape from an aperture in the lock body 605 that receives a secured end of the shackle 610. Weep or access hold 607 may also be used to allow for a tool to access internal components when the shackle 610 is removed. A thru-bore 606 allows for a tool to be inserted into the lock body 605 when the shackle 610 is removed. Thru-bore 606 may also function as a weep hole to allow moisture and/or debris to escape from the aperture in the lock body 605 that receives a secured end of the shackle 610. A pair of contact terminals 604 allows the internal electrical components to be "jump started" via an external battery in the event of that the internal power supply is discharged. An external sensor 603 may be a touch sensor, such as a capacitive or resistive sensor, to receive an input code to actuate the electronic lock 600.

Figure 7:
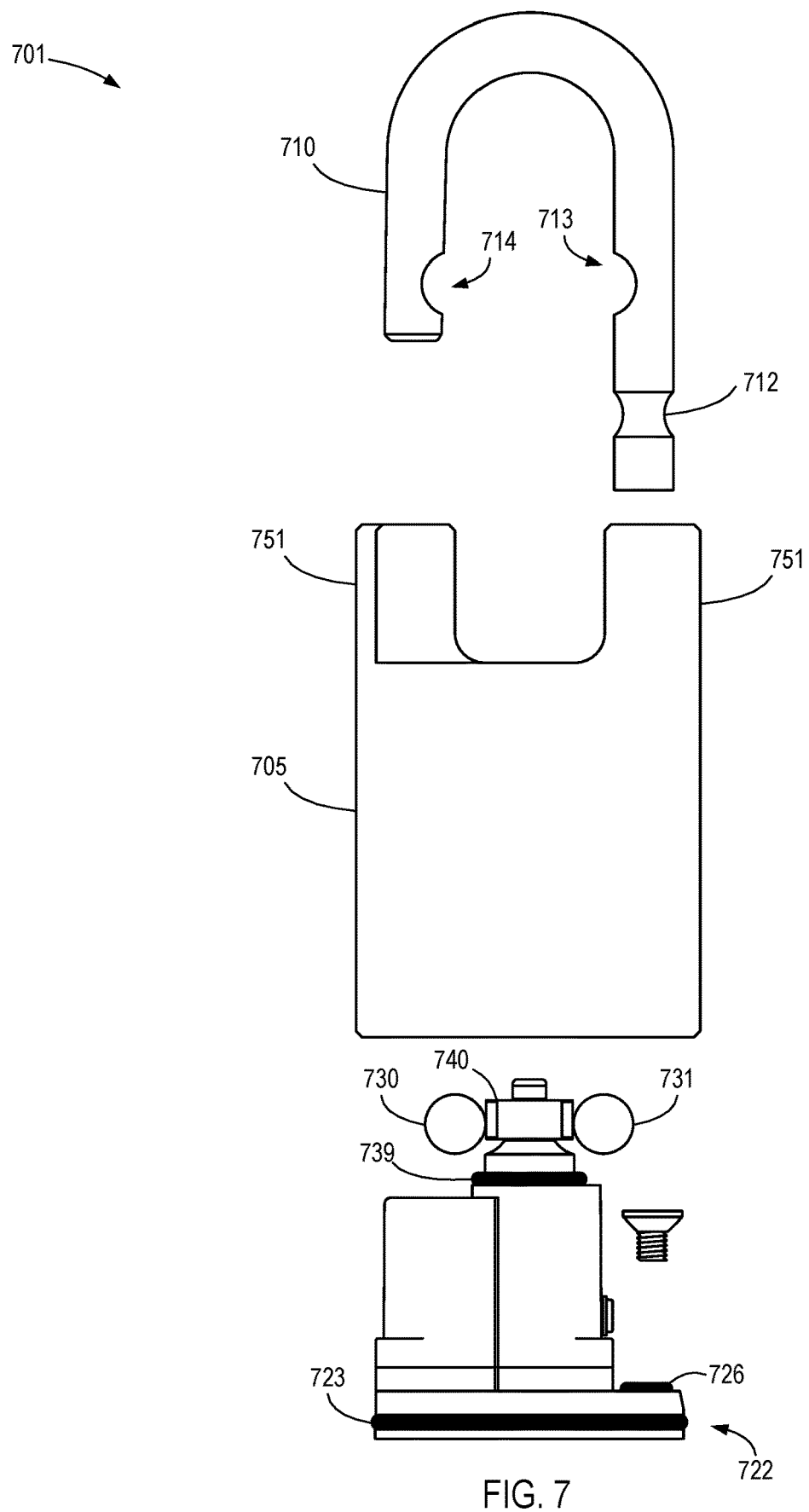
FIG. 7 illustrates an exploded view of several portions of a keyless electronic lock with a shrouded-shackle lock body, according to one embodiment.

FIG. 7 illustrates an exploded view of a keyless electronic lock 701 with a lock body 705 that includes shackle shrouds (i.e., a shrouded-shackle lock body). The shrouded-shackle lock body 705 has two shackle guard flanges 751 (i.e., shackle shrouds) which protect the removable shackle 710 when it is in a locked state to prevent access thereto for cutting or leveraging. A shackle 710 is shown with a lock notch 714, another lock notch 713, and a revolved notch 712 along the distal end of the secured end of the shackle 710. A gasket 723 may seal the baseplate 722 to the lock body 705. When assembled, the asymmetric cam 740 and ball bearings 730 and 731 are aligned with the lock notches 713 and 714 in the shackle 710. The keyless electronic lock 701 includes seals 723, 726, and 739.

FIG. 8A illustrates a standard shackle 810 with a uniform diameter, according to one embodiment.

FIG. 8B illustrates a base-and-taper shackle 811 that can be interchangeably used with various keyless electronic locks described herein, according to various embodiments. As illustrated, the distal end of the shackle 811 may be the same diameter as the standard shackle 810, while the proximal end of the shackle 811 may be narrower for use in locking applications that benefit from the use of narrower shackles.

FIG. 8C illustrates an extra-long base-and-taper shackle 812 that can be interchangeably used with various keyless electronic locks described herein, according to various embodiments.

FIG. 8D illustrates a hitch receiver lock assembly 885 that can be used interchangeably with the other shackles compatible with the various lock bodies described herein.

FIG. 8E illustrates an oversized shackle 886 with tapered ends for compatibility with the various lock bodies described herein.

The padlocks with interchangeable shackles described in FIGS. 8-8E can be programmed or otherwise configured, by themselves and/or in conjunction with a supporting server infrastructure, mobile applications, desktop applications, etc., to facilitate multiple keyholders. Thus, any of these variously described padlocks may be used to lockout a lockout location of a machine. In some embodiments, as is well-understood by lockout-tagout experts, a padlock may be used to lock a lockout device that can be positioned or inserted within a lockout location to effectively lockout the machine.

As an example, a rotatable valve may not readily receive a padlock for lockout purposes. However, a lockout device, such as a cover, may be placed on the rotatable valve and then a padlock can be used to lock the cover in place. In such an embodiment, the padlock can be said to be locking out the lockout location of the machine even though it is indirectly doing so through the lockout device. A lockout management system, as described herein, may facilitate a multi-keyholder lockout of one or more lockout locations of one or more machines using any of the various padlock embodiments described herein.

Figure 9:
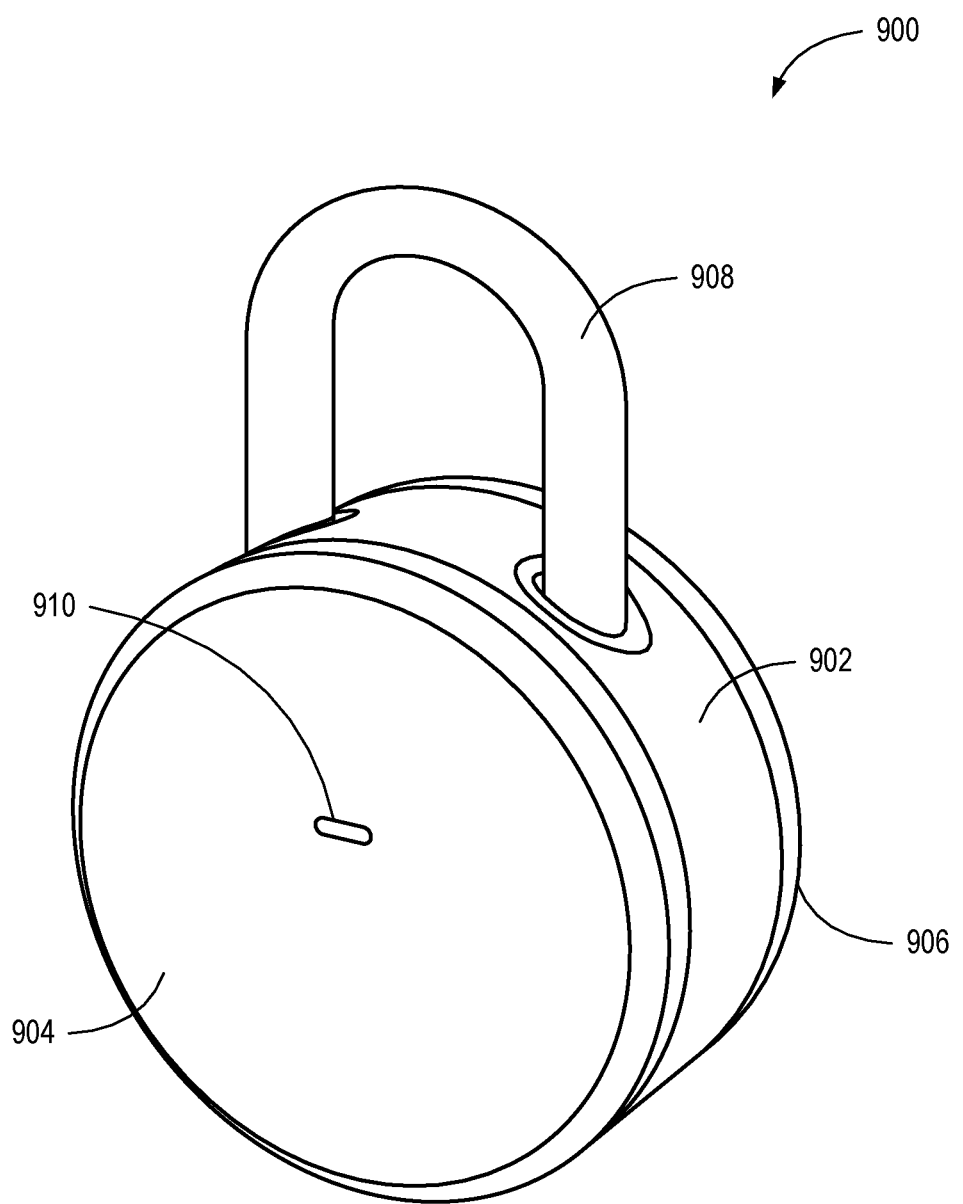
FIG. 9 illustrates a perspective view of an electronic padlock, according to one embodiment.

FIG. 9 is a perspective view illustrating another embodiment of a padlock that can generally be referred to as one example of an electronic locking device 900. The electronic locking device 900 can be a padlock that includes a lock body 902, a front end cap 904, a back end cap 906, and a shank 908. An LED status light 910 can show status by displaying multiple colors, multiple blink patterns, solid lights, and/or nothing. The status light 910 can show states including waking up, going to sleep, locked, unlocked, entry type (e.g., short or long quick-click entry as described in detail in the applications incorporated by reference above), successful password, unsuccessful password, communication speed, communication status, channel, connectivity, and/or reset.

Electronics can be housed inside the lock body 902, and antennas can be built into the circuit boards and/or the external case (such as the lock body 902, the end cap 904 or 906, or the shank 908). In one embodiment, the front end cap 904 includes an antenna strip. In another embodiment, the back end cap 906 is configured to be transparent to wireless signals. In yet another embodiment, a solar panel may be built into the external case to charge the battery.

In some embodiments, the end caps 904 and 906 can be removed. In one example, the end caps 904 and 906 can be removed when in an unlocked state, but not when in a locked state. For instance, when the shank 908 is in a locked position, it may push a pin laterally against the end caps 904 and 906. The end caps 904 and 906 may have a recess where the pin enters and prevents the end caps 904 and 906 from being unscrewed. In another example, the front end cap 904 can only be removed in an unlocked state, but the back end cap 906 can be removed to expose a removable battery (such as described above). Other combinations are also possible.

Figure 10:
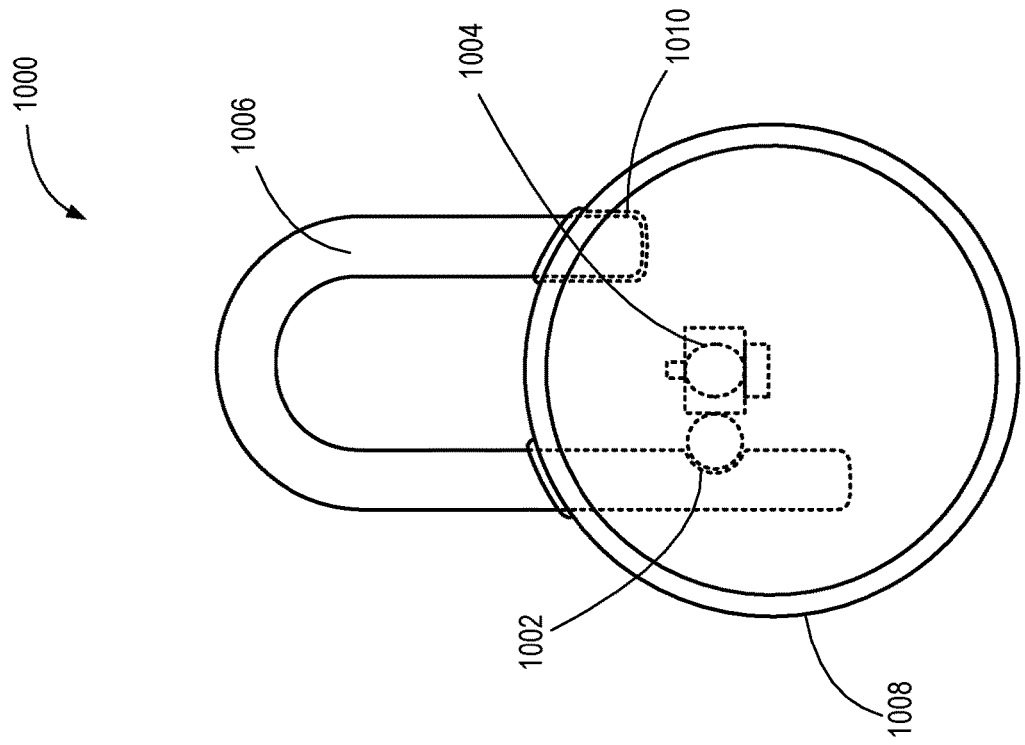
FIG. 10 illustrates a front view of an electronic locking device with a single notch in an unlocked state, according to one embodiment.
Figure 11:
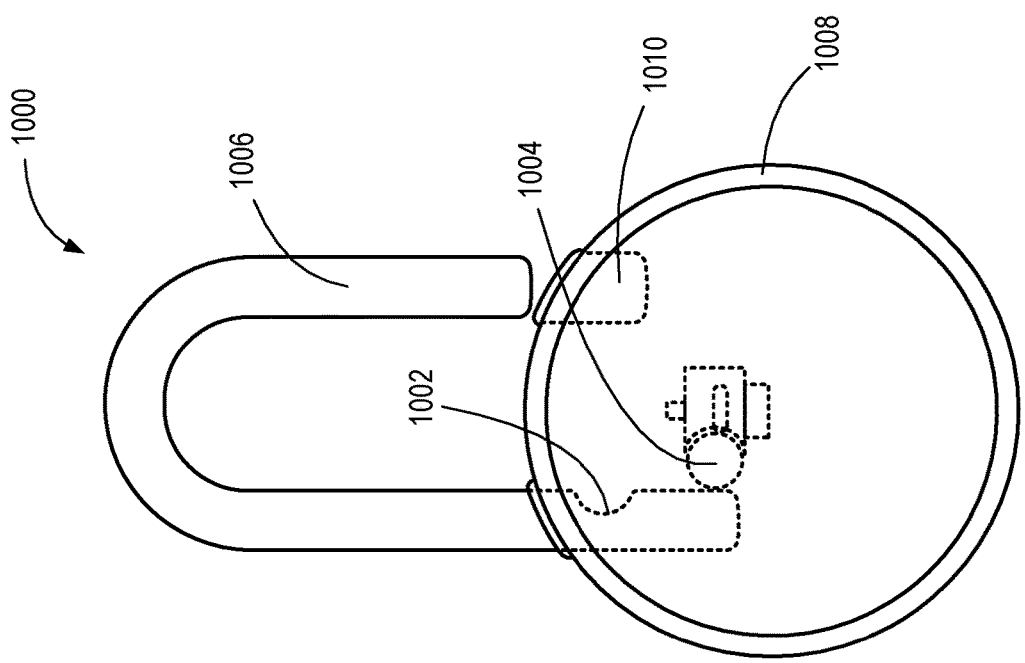
FIG. 11 illustrates a front view of the electronic locking device with a single notch in a locked state, according to one embodiment.

FIGS. 10 and 11 illustrate frontal views of an electronic locking device 1000 with an alternative single notch 1002 and post locking mechanism 1004. In some instances, the electronic locking device 1000 may be used in a location where moisture, such as rain, is present. Therefore, it may be necessary to weather seal or waterproof the electronic locking device 1000. This may be accomplished by utilizing the single notch 1002 and post locking mechanism 1004.

To remove the electronic locking device 1000 from a secured location, the shank 1006 is extended away from the body 1008 until one end of the shank 1006 is removed from the body 1008. With a traditional double notch locking system (i.e., the shank has a notch on both sides), the end of the shank 1006 that is removed from the body may collect moisture. When the end of the shank 1006 is introduced back into the body 1008, moisture is then introduced into the electronic locking device 1000. This introduction of moisture may be prevented by using the alternative single notch 1002 and post locking mechanism 1004 as shown.

For example, the side of the shank 1006 that is capable of being removed from the body 1008 may be a sealed dummy hole 1010. Instead of entering the body 1008 after being removed, the end of the shank 1006 may enter a hole that has been sealed to the elements. The hole may be formed from the same material as the body 1008, or it may be silicone or some other material capable of preventing water intrusion.

To keep the electronic locking device 1000 in a locked position, there may be a notch 1002 and a post on the other side of the shank 1006. This side of the shank 1006 may also be designed to prevent water intrusion. For example, a silicone seal may be used to prevent moisture from entering into the body 1008. Further, the notch 1002 in the shank 1006 may be placed low enough that it never reaches the silicone seal. This would allow the silicone seal to be tightly fitted to the shank 1006 to prevent moisture intrusion. Again, any variation of the padlocks described in conjunction with FIGS. 9-11 may be programmed and/or otherwise configured as multi-keyholder electronic locks suitable for use with the lockout management systems and methods described herein.

In various embodiments, a user may access an application with the illustrated interface on a laptop, computer, mobile phone, tablet, etc. In some embodiments, all users may use a single electronic device (e.g., tablet, phone, wall mounted device, laptop, computer, mobile phone, etc.) that is, for example, integrated as part of a machine to be locked out. In such embodiments, fast-user switching may be available to facilitate the multi-user interactions. In some embodiments, each user enters credentials (e.g., PIN, username/password, token, biometrics, etc.) into a single user interface. In some embodiments, a user interface of the application may allow a mobile device to be paired with a wireless-enabled locking device for faster access in the future.

In some embodiments, all users may use a single electronic device (e.g., tablet, phone, wall mounted device, laptop, computer, mobile phone, etc.). In some embodiments, fast-user switching is utilized. In some embodiments, each user enters one or more credentials (e.g., PIN, username/password, token, biometrics, etc.) into a user interface on a common electronic device. In some embodiments, a user interface of the application may allow a mobile device to be paired with a locking device for faster access in the future.

In some embodiments, a locking device may be programmed with a default set of inputs for authentication. Providing such inputs may authenticate the lock, allow it to be paired, and/or allow for various configuration settings. In some embodiments, the pairing may include Bluetooth or ZigBee pairing, for example.

In some embodiments, a local access point or a central server may be utilized for all locking devices on the system. In some embodiments, each locking device may be associated with one local access point and/or a local server. In some embodiments, each machine (e.g., machines to be locked out) may be associated with one local access point and/or the local server. For example, a machine may be locked out using three locks. The three locks of the machine may be associated with one local access point. The lock(s) of a second machine may be associated with a second local access point.

In some embodiments, the local access point and/or local server may control a region of machines and locks. For example, multiple machines located in "Building B" or the machines located within 20 meters of the local access point and/or local server may be associated with a common local access point and/or set of common local access points (e.g., access points in primary/backup or primary/primary configuration). In some embodiments, the local access points and/or local server may be synchronized with the central server instantaneously and/or synchronized with the central server when a connection becomes available. In some embodiments, a local access point may receive and authorize (or reject) credentials for locking and unlocking the locking devices associated with the local access point, even when the local access point is offline with respect to a centralized server.

In some embodiments, authentication may include real-time confirmation that the user (e.g., the technician) is certified to repair, maintain, or otherwise alter the device or machine. In some embodiments, authentication includes comparing the user credentials to a credentials database. In some embodiments, the credentials database may be owned and maintained by a third party. In some embodiments, the credentials database may be maintained by the operator of the lock system, and the lock system may be provided to the user as a SaaS model. In some embodiments, the credentials database may be maintained by an owner of the devices utilizing the locking system (e.g., the machines being locked out).

In some embodiments, the credentials database may maintain user certification to ensure the user is authorized. In some embodiments, the credentials database may require technicians to provide or update certifications on a periodic basis. If the user is not authenticated, the user is not authorized to lockout the device and/or the lock, locking system, local access device, and/or the device or machine being locked out may send a notification to the user's supervisor. If the user is authenticated, the user may lockout the device and start working. In some embodiments, a notification may be sent to the user's supervisor and/or other related parties informing the supervisor and/or another party that the user started working on the device.

In some embodiments, credentials utilized by a user to lock the device may be different from the credentials utilized by the user to unlock the device (i.e., remove themselves as a keyholder on a multi-keyholder locking device). For instance, the user may utilize a PIN to lock the device and a user ID card (e.g., a driver's license, passport, company-issued identification) to unlock the device. The user ID may be scanned by an electronic tablet, phone, or another device. In some embodiments, the user may be required to utilize one type of credential for locking the device (i.e., adding themselves as a keyholder to a multi-keyholder device) and a different type of credential for unlocking the device (i.e., removing themselves as a keyholder from a multi-keyholder device). Examples of credentials include, but are not limited to, tokens, passwords, PINs, chips, ID card, biometrics (e.g., fingerprints, facial recognition, retina recognition, voice authentication, etc.), one-time passwords, one-time PINs, scratch-off cards, magnetic stripes, knowledge-based questions, questions based on personal information, smart cards, graphical passwords, or any combination of these or other credentials.

In some embodiments, even absent an authorized mobile device (e.g., a user forgot a mobile device, a mobile device is not within wireless range, or a battery of the mobile device is depleted), the lock may be unlocked using a series of physical interactions (quick-clicks). The pattern of physical interaction or quick-clicks can be displayed and modified by the user. A dot may represent a short "click" and a dash may represent a long "click." As previously described, the term "quick-click" is used in the general sense of requiring physical input interactions of some form, although they may not strictly comprise an actual "click." For example, the series or pattern of physical interactions may be provided via a button, switch, toggle, light sensor, motion sensor, resistive touch sensor, capacitive touch sensor, and/or other physical input sensors.

In one embodiment, each lock comes pre-provisioned with a series of master quick-click codes that can be used to reset and/or open the lock. These master quick-click codes may be one-time use codes and may be provisioned only by the manufacturer or owner, and/or included in the lock at the time of purchase. In some embodiments, a master quick-click code may be known and used by a supervisor with bolt-cutting authority to effectively reset the lock, thereby removing all keyholders.

In some embodiments, a fob may be associated with a specific user and facilitate adding and removing the user as a keyholder on a specific lock or to any lock within a facility using a lockout management system, as described herein. Various tracking services and data logging information may be available. A lock can communicate with a mobile device and/or a lock application service over a network, such as a local- or wide-area network. Authentication may be performed in the lock, in the mobile device, and/or via a server. The server may include load balancers capable of decryption, application servers, storage, control servers, and/or a data logging service.

Manual lockout-tagout procedures may result in burdensome paperwork requirements and confusion with the number of mechanical locks and keys. A Bluetooth (or other wireless-enabled) lock, such as a padlock or other locking device, may operate in conjunction with a mobile, desktop, web-based, or client-server application to allow a user to add multiple keyholders to a single lock. The lock cannot then be unlocked until each added keyholder personally removes himself or herself as a keyholder using his or her digital key. Such digital keys may comprise personal PIN codes or passwords, digital keys stored within personal mobile devices, cloud-based digital keys, or the like. In some embodiments, the system may utilize blockchain-based digital keys and/or blockchain-based identities for authentication, provisioning of digital keys, adding keyholders, removing keyholders, and/or implementing other features of the systems and methods described herein.

Figures 12, 13:
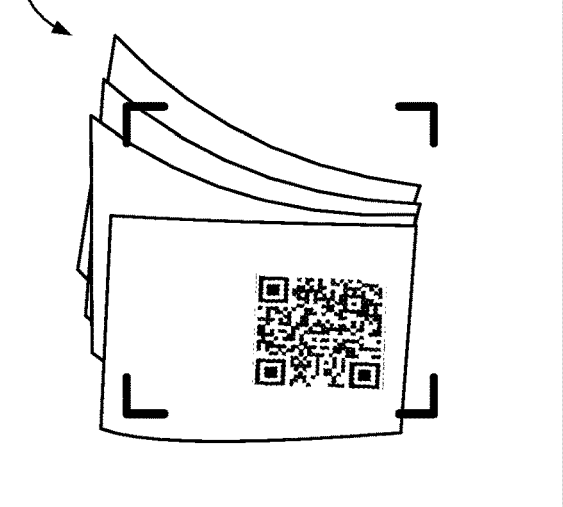
FIG. 12 illustrates an example of a graphic user interface (GUI) of a mobile application for scanning a QR code at a machine location.
FIG. 13 illustrates an example GUI of a mobile application to add users whose approval is required to unlock the mechanism.

FIG. 12 illustrates an example of a graphic user interface (GUI) 1200 of an input module of a lockout management system. Specifically, the illustrated portion of the GUI 1200 facilitates scanning a QR code 1210 associated with (e.g., on or proximate) a machine and/or at a lockout location of a machine. The lockout process on a mobile application may begin with an observed defect or scheduled maintenance that requires an authorized user to repair the machine. The operator or the authorized user may begin the lockout process. For example, the process may begin by scanning a QR code 1210. Although many of the examples provided herein describe or illustrate a QR code, other identifying features or information may be scanned or manually entered, at 1220, into the application.

For example, an operator may enter or scan a serial number, model number, machine location, defect location, or another code. The machine identification may differ from the machine location. A machine may have several different lockout locations. For example, machine lockout locations may include hydraulic, pneumatic, and electrical subsystems. Each subsystem may require a distinct lockout to prevent the release of hazardous energy. The user may scan a machine lockout location (e.g., through a QR code) or manually enter the location into the mobile application to begin the lockout process.

FIG. 13 illustrates an example GUI 1300 of a keyholder management subsystem of a lockout management system to add one or more users (i.e., "keyholders" from the perspective of the lockout management system), such as affected users, whose approval is required to unlock the locking device. Once the user identifies the machine location, the user may add keyholders or keyholders may be auto-populated based on the machine location or machine type. The GUI 1300 may include navigation icons 1310 to access other portions of the lockout management system, such as a home screen, machine management page, user management page, activity/history page, and/or system settings.

The following nonlimiting example may facilitate an improved understanding of a method of using the systems described herein. Bob may be an operator that notices machine vibrations that seem abnormal to him. Upon discovery of the defect, Bob scans a QR code associated with the machine. The mobile application may help him locate the machine lockout locations and place one or more locking devices, such as padlocks, to prevent further operation of the machine. He may add himself as a keyholder such that the locks cannot be removed until he authorizes their removal. The lockout management system and/or Bob may add his supervisor "Jim" as a keyholder. The lockout management system may notify Jim and two authorized users (e.g., repair technicians) "Steve" and "Dave" immediately.

If two authorized users work on the machine, they may each individually lockout the machine by adding themselves (if not already added) as keyholders to the locking devices (e.g., padlocks) to prevent operation of the machine while they are working on it. Regulatory or company policies may require individual lockout by each "affected" person. The authorized users can comfortably work on otherwise dangerous machines and equipment knowing that no other person can initiate operation of the machine until each of them personally unlocks the device. Thus, if the machine requires five technicians, lockout procedures may traditionally require five distinct padlocks to be placed on the machine lockout locations. The ability for a user to add themselves to the lock, for example, when servicing the machine, enables faster repair times and decreased complexity in implementing a lockout procedure. A single padlock can be uniquely locked by multiple keyholders, all of whom must, in turn, give authorization in order to unlock the padlock.

Toby, the authorized user in charge, may be the lead repairman or technician with oversight authority over both Steve and Dave. The mobile application notifies Toby to confirm Steve and Dave's authority to work on the machine. In some embodiments, the mobile application can verify Steve and/or Dave as authorized users of the machine location. Toby may also certify that the repair is complete. Charles is a manager with bolt-cutting authority. Charles may be added in case any of the keyholders are later unable to remove themselves as keyholders after having completed their assignments (or after having been mistakenly added as a keyholder in the first place). Charles may utilize his bolt-cutting authority to override the lock if keyholders are unable to remove themselves as keyholders (or after being mistakenly added as a key holder). Bolt-cutting authority may be granted to any number of users associated with the system. In some embodiments, bolt-cutting may require two or more users with bolt-cutting authority to confirm the operation.

The lockout management system may utilize mobile and/or desktop applications to notify keyholders periodically for required tasks related to the machine location lockout. For example, the lockout management system may automatically remind an authorized user scheduled to perform routine maintenance. When an unexpected repair arises, the lockout management system may notify the authorized user (e.g., technician) periodically and/or update the supervisor of the machine status. The automatic notifications may differ for each user and may occur once, or repeat every hour, day, week, month, or any other period (e.g., bi-weekly, bi-monthly, or annually). The user may manually input the alerts or adjust alerts automatically assigned by the application. In some embodiments, the application automatically assigns alerts.

Although the process described above includes the manual addition of keyholders, the machine location QR code may indicate which of a plurality of stored (inactive) keyholders should be automatically added as active keyholders for a locking device placed at the machine location. For instance, the system may automatically add keyholders (e.g., Bob, Jim, Steve, Dave, Toby, and Charles) or recommend names of potential keyholders listed by name, title, responsibilities, expertise, certifications, experience, educational background, specialty, and/or the like. In addition, although Bob is the operator who noticed the defect, other operators may be added as active keyholders of the locking mechanism to prevent further operation of the machine (e.g., Bob works a first shift and operators Dave and Steve work second and third shifts respectively).

In some embodiments, any keyholder may add other affected parties regardless of job title or position. As such, there may be no practical limit on the number of keyholders added at a machine location. The objective of adding these additional keyholders is to ensure the safety of all affected parties and to ensure compliance with safety regulations. In some embodiments, all users may use a single electronic device (e.g., tablet, phone, wall mounted device, laptop, computer, mobile phone, etc.). In some embodiments, fast-user switching is utilized. In some embodiments, each user enters credentials (e.g., PIN, username/password, token, biometrics, etc.) into a single user interface. In some embodiments, a keyholder may be a role-based keyholder associated with multiple individuals. For example, a keyholder added during a lockout procedure may be a "safety manager." In reality, there may be three different people that are each considered a "safety manager" and work different shifts. Depending on when the work is complete, any one of these individuals may remove the safety manager keyholder from the lock to allow it to be removed.

Figure 14:
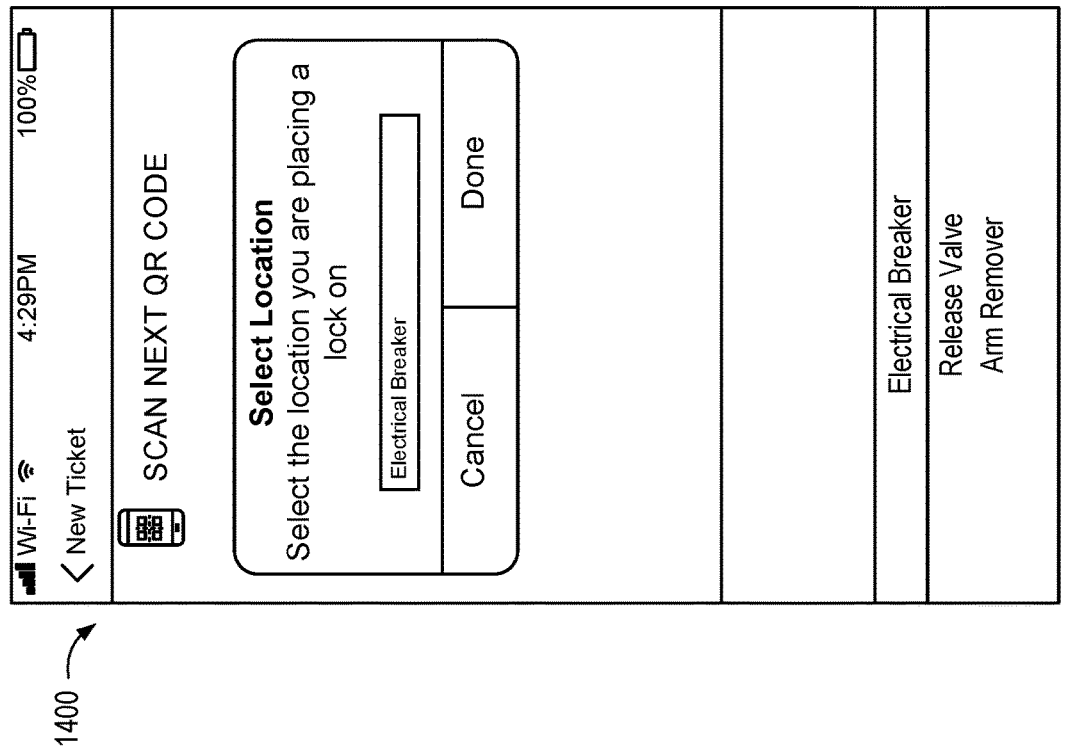
FIG. 14 illustrates an example GUI of a mobile application to lock a specific machine location, according to a lockout-tagout procedure.

FIG. 14 illustrates an example GUI 1400 of a lockout location subsystem of a lockout management system to manage the locking of a specific lockout location on a machine, according to a lockout-tagout procedure. A user may identify the machine location to receive, for example, a Bluetooth padlock and then assign himself or herself and/or other individuals as affected keyholders. Alternative systems may reverse the order of some of the operations described herein. For instance, the user may identify keyholders before assigning the machine location.

The electrical breaker location may require a lock to prevent the hazardous electrical energy during operation of the vibrating machine. A system may utilize the mobile application (e.g., on an iPhone or Android device) to specify the machine location of the lock (e.g., the electrical breaker). Once identified, the system may provide specific, detailed instructions for steps to safely lockout the machine location.

For example, the application may provide photos, videos, or text instructions to the operator (Bob) to properly shut down (i.e., lockout) an electrical breaker. The mobile application may provide additional instructions to lockout a mechanical lever, and still more instructions to lockout a pneumatic component. The system enables different locking instructions for a variety of machine locations. A single machine may require a variety of instructions, confirmations, locks, descriptions, and/or other operator actions to comply with established safety lockout procedures.

Figure 15:
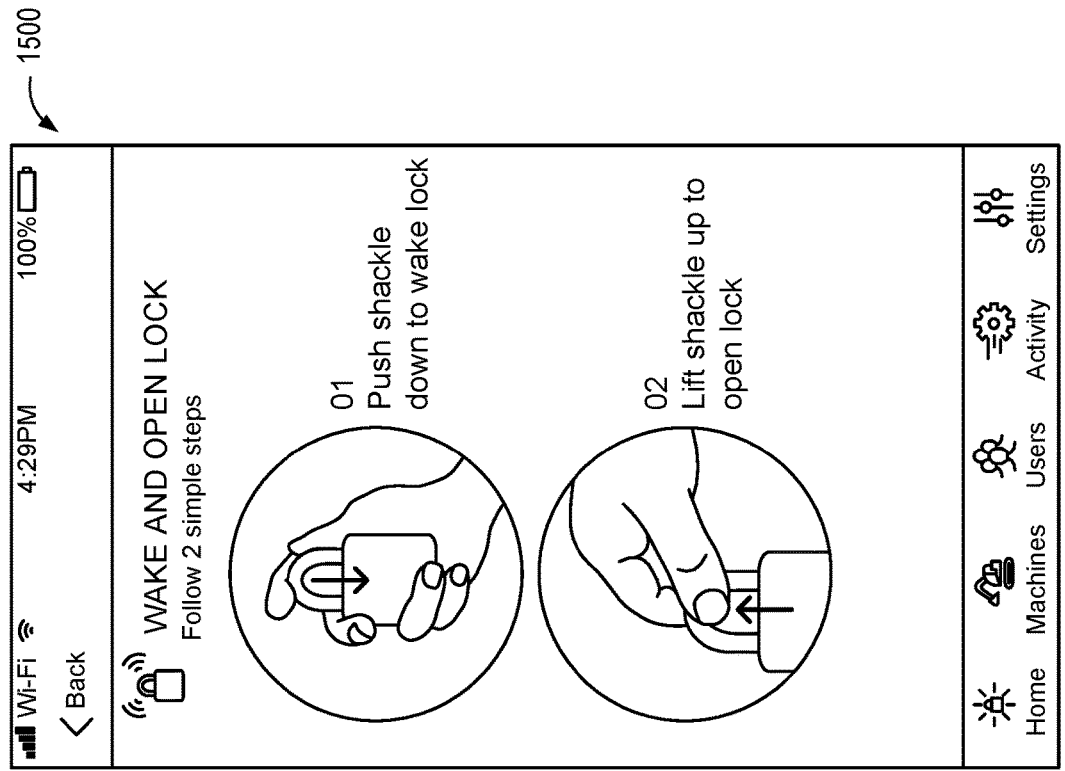
FIG. 15 illustrates an example GUI of instructions that a mobile application may provide to a user to wake and open a lock.

FIG. 15 illustrates an example GUI 1500 of an instruction subsystem of a lockout management system providing instructions to a user to wake and open a lock. As the illustrated instructions are completed, the lockout management system may provide a next set of instructions via the GUI 1500. For example, once the lock is awake, the mobile application may direct the user to place the lock at a lockout location to satisfy a lockout procedure. In some embodiments, the mobile application may automatically detect that the lock has been awakened and advance to the next set of instructions. In other embodiments, the user may manually request the next step of instructions.

For some locations, the instructions may require pushing the shackle down to wake up the lock and lifting the shackle up to open the lock, as described in greater detail in the applications incorporated herein by reference. In some situations, a padlock may adequately lockout a lever at a machine location. In other situations, such as when locking out pneumatic valves or hydraulic lines, a more complex locking mechanism may better serve to lockout the device. The system allows for detailed, custom instructions for any of a wide variety of lock types, locking devices, lockout devices, etc. for different types of lockout locations on various machine types.

Figure 16:
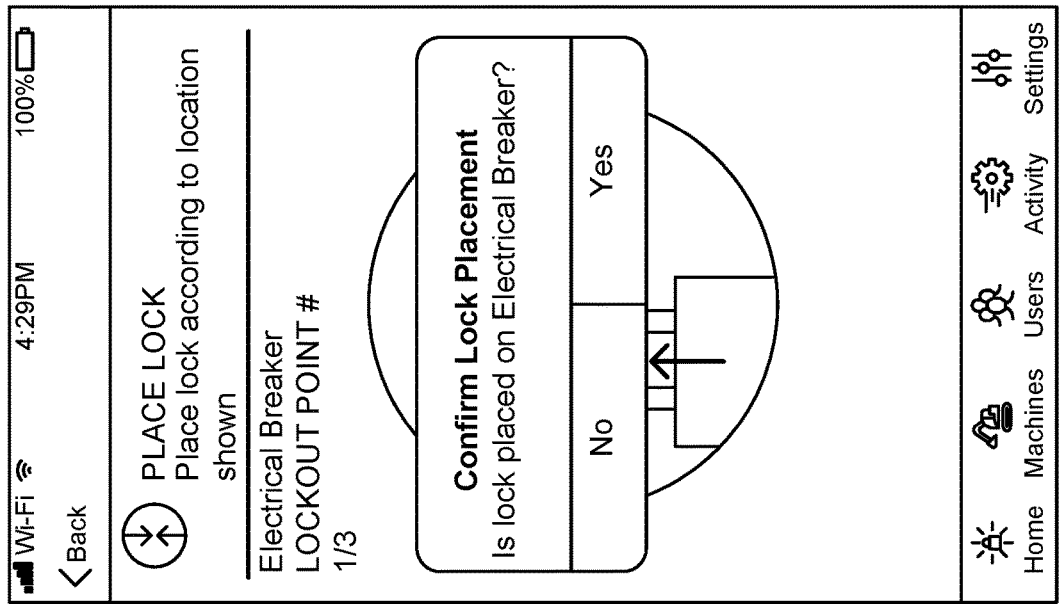
FIG. 16 illustrates an example GUI of a lock placement confirmation prompt to satisfy regulatory and/or documentation requirements of a lockout-tagout procedure.

FIG. 16 illustrates an example GUI 1600 of a lockout confirmation subsystem of a lockout management system with a lock placement confirmation prompt to help satisfy regulatory and/or documentation requirements of a lockout-tagout procedure. The lockout management system may request the operator to confirm the placement of the lock. The user confirms he or she locked the specific machine location. Traditional safety regulations require a physical signature from each user following a lockout procedure. Regulatory, industry, and/or company regulations may allow for alternative protective measures (APMs) that are better than or equal to traditional approaches. For example, a digital confirmation (e.g., a thumbprint) may replace the signature requirement. APMs allow such variations where the improvements enhance safety or document management. An electronic confirmation, in lieu of a physical signature, allows for real-time visualization of the confirmation. Confirmation can be securely stored and instantly accessed electronically. Electronic confirmations also ensure better compliance with lockout procedures. Therefore, APMs provide accommodation for the electronic confirmation of lock placement.

Figure 17:
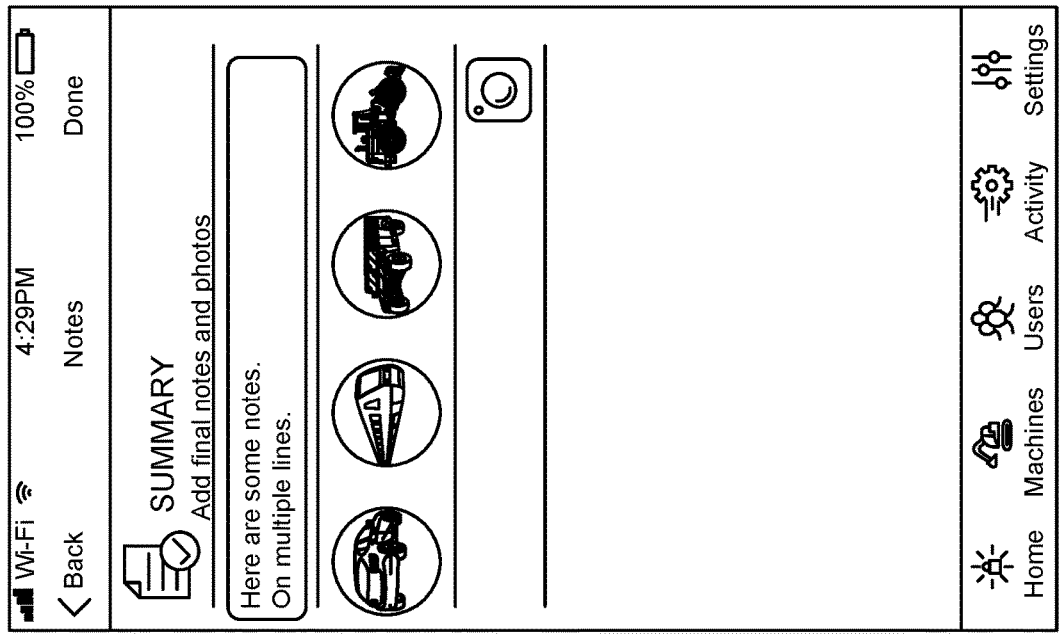
FIG. 17 illustrates an example GUI of a summary of defects and/or notes of user observations of the machine that may assist an authorized user.

FIG. 17 illustrates an example GUI 1700 of a lockout summary subsystem of a lockout management system showing a summary of defects and/or notes of user observations of the machine that may assist an authorized user. In various embodiments and adaptions, the lockout management system may change or reverse the order of operations. For example, the lockout management system may request a summary prior to assigning keyholders. In some embodiments, the order of operations may change based on the inputs the user selects. For example, if the user selects an electrical breaker for lockout, the system may present a first set of instructions. If the user selects a release valve for lockout instead, the lockout management system may present a second set of instructions. Thus, the selection and order of the screens in the application is variable based on user actions, the specific equipment, and/or the customization of the system by the company.

The lockout management system may request (or require) a detailed summary including photos, notes of observations, attempted repairs, and/or proposed future repairs of the machine. The summary may indicate a timeline for the repairs. For example, if the machine is mission critical and urgently needed, the summary may indicate a high priority level to the authorized users. The lockout management system may request specific comments on the problem and any perceived causes or repairs in the lockout summary.

Figure 18:
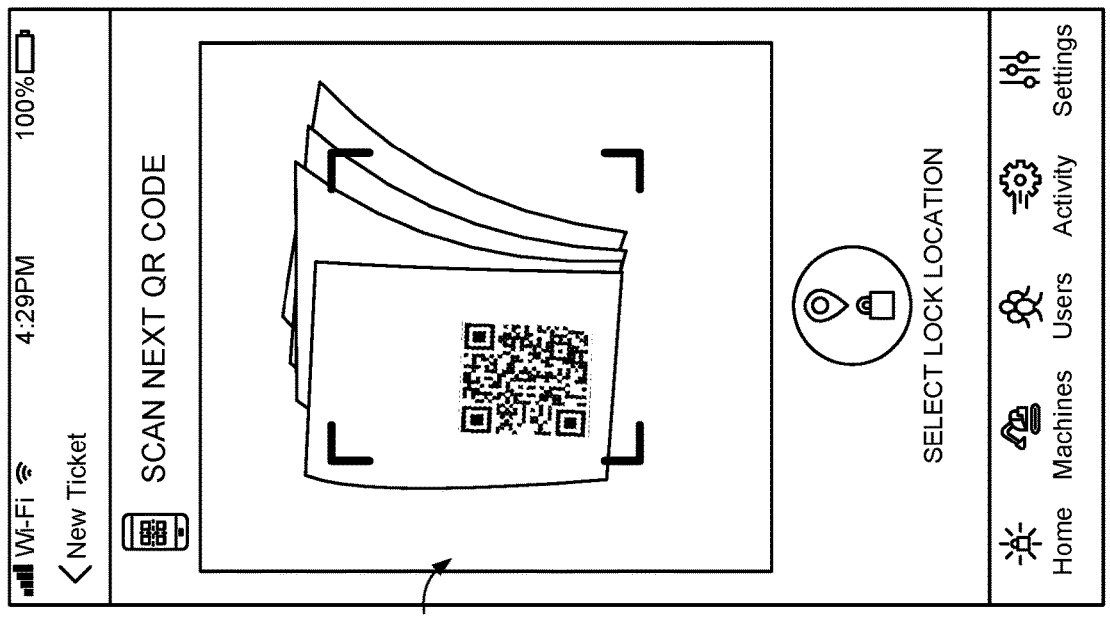
FIG. 18 illustrates an example GUI for scanning another machine location to lockout several machine locations.

FIG. 18 illustrates an example GUI 1800 of the input subsystem of the lockout management system for scanning a "next" machine location to lockout several lockout locations on a single machine. As illustrated, a user may scan a second QR code 1810 associated with another locking device and/or lockout location on the same portion of the machine and/or another portion of the same machine. For example, the first QR code (shown in FIG. 12) may be associated with a first lockout location of the affected machine. The second QR code 1810 may be associated with a second lockout location of the affected machine, and third, fourth, fifth, etc. QR codes may define lockout procedures for any number of affected locations. In some embodiments, a single QR code for a machine may sequentially provide lockout instructions for multiple lockout locations of a single machine.

Figure 19:
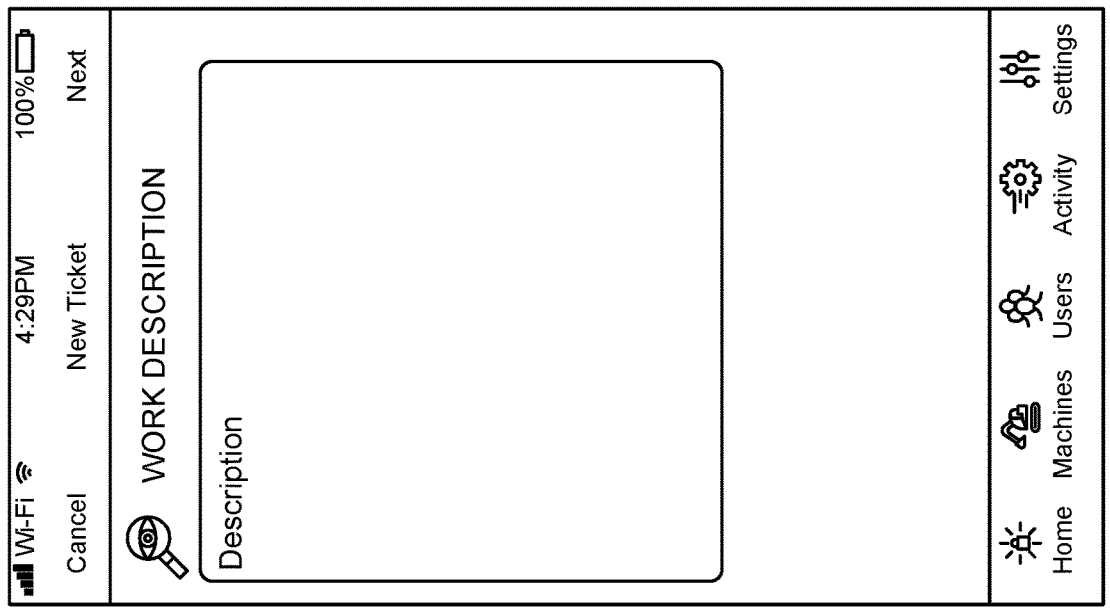
FIG. 19 illustrates an example GUI for inputting repair details, photos, or a video walkthrough of the work performed.

FIG. 19 illustrates a GUI 1900 of an information collection subsystem of a lockout management system to receive repair details, photos, or a video walkthrough of the work performed by an affected user. As illustrated, additional fields may be optional or required for successful completion of the repair. In some instances, the additional fields may be customized with required portions and/or optional portions to satisfy certification, maintenance, warranty, and/or regulatory requirements. Once an authorized user (e.g., repair technician) has repaired the issue in a ticket and added any necessary or optional keyholders, the system may ask or require the authorized user to document the repair. For example, the authorized user (or authorized user in charge) may describe the work performed in a work description. In some embodiments, the authorized user cannot complete his or her authorization until he or she uploads a photo or video walk-through of the completed repair. This documentation is readily accessible for safety audits. The documentation also records the repair process for future reference. Using real-time updates of the lockout process also reduces errors, decreases the time required to restore normal operations, and seamlessly organizes safety documentation. The system may prompt or even require the authorized user to provide adequate documentation prior to allowing the authorized user to submit his or her digital key to unlock the machine location (e.g., remove himself as a keyholder on the Bluetooth lock).

Figures 20, 21:
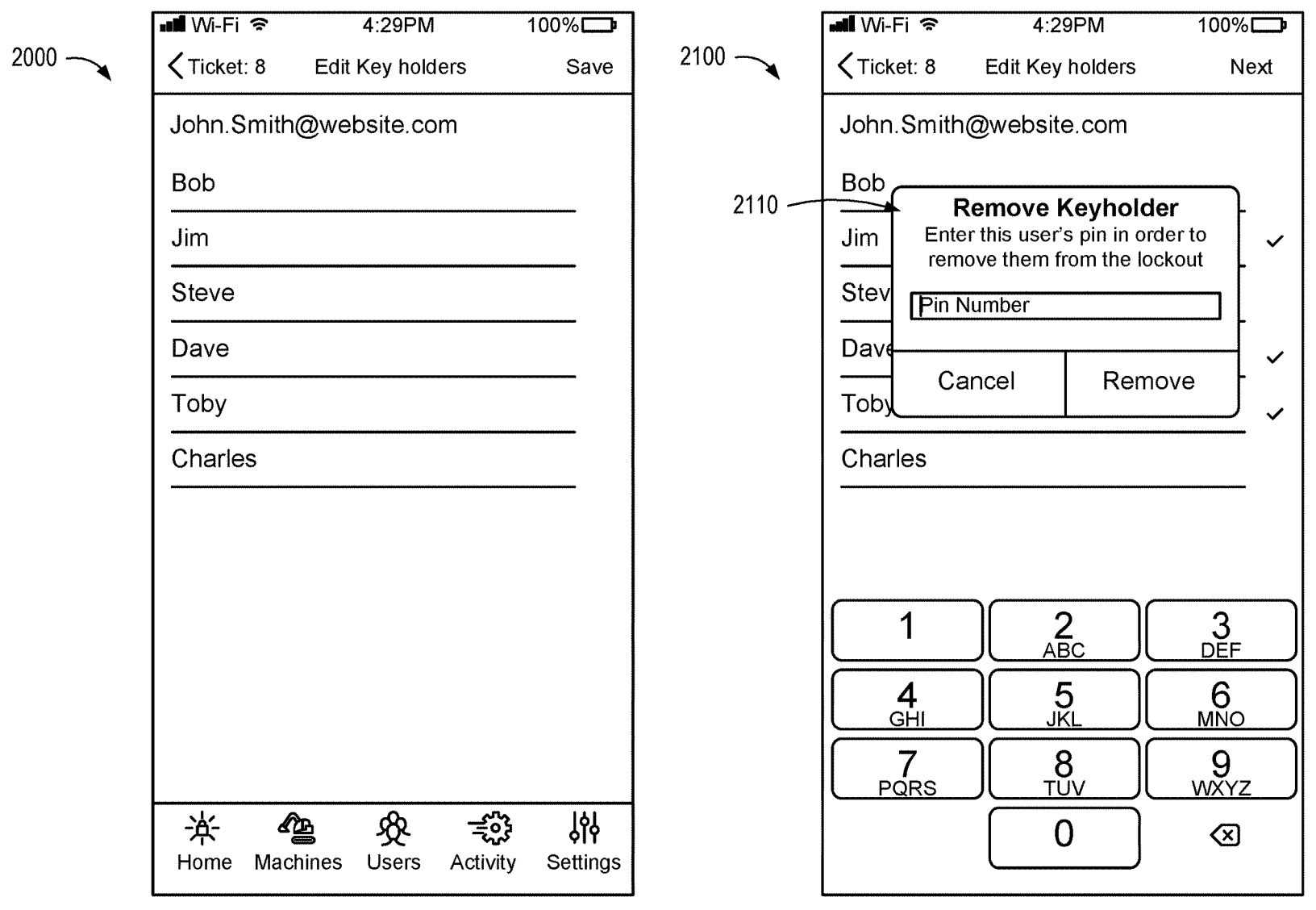

FIG. 20 illustrates a GUI 2000 of a lock management subsystem of a lockout management system with a list of keyholders that are each required to unlock the locking device before the locking device can actually be removed from a locked machine. An email address or other contact information may be displayed to provide access to a supervisor or another affected party associated with the lockout.

FIG. 21 illustrates an example GUI 2100 of a keyholder removal subsystem of a lockout management system showing a prompt 2110 enabling the removal of a user from the lockout by entering a PIN. In some instances, a person may not have access to the device after an approved repair. Rather than invoking bolt-cutter authority, another user may contact the party and request a single-use PIN or passcode. For example, a keyholder may not have access to the application and/or not be in proximity of a short-range wireless-enabled lock (e.g., a Bluetooth padlock). Short-range wireless-enabled locks may have a range of a few feet, a few meters, or only within the facility or environment within which the machine is being operated. For example, network-enabled locks may be accessible via a wide-area network connected to a local-area network. A network-enabled lock may be accessible from any remote location with access to the Internet. Wireless-enabled locks may have a wireless communication range of less than a few hundred feet, while short-range wireless-enabled locks may have a wireless communication range of a several feet (e.g., Bluetooth, RFID-based and NFC-based padlocks).

In some embodiments, the network may be unavailable. For example, the locking device may be located outside of a wide- or local-area network. Network inaccessibility may limit electronic communication between locking devices and mobile or desktop applications and/or centralized servers of the lockout management system. For example, at the bottom of a mineshaft, heavy equipment may require a lockout-tagout procedure. Network connectivity may be unavailable. Where the lockout system is cloud-based, eventual continuity may allow periodic updates when a user does have access to the network. In some embodiments, the locking device may be locked when offline, but the locking device may not be unlocked when offline. Once the lock establishes a connection, a locking action made when the lock was offline is uploaded to the server. In some embodiments, unlocking is explicitly prohibited, disabled, or not available as a feature at all when the locking device is not connected to the server.

In some embodiments, a quick-click design may enable a series of patterns assigned to each keyholder where limited network ability exists. For example, a quick click (as, for example, described in the applications incorporated herein by reference) may enable tap, touch, click, or another combination of inputs for each keyholder without the need for a physical key or an electronic key sent by a mobile device. For instance, each keyholder may click the shackle or touch a touch sensor on the lock body with a predetermined combination of short and long actuations to remove themselves as keyholders.

In some embodiments, authentication of unlock attempts (e.g., bolt-cutting, removing keyholder) by users are exclusively allowed through servers. In some embodiments, each interaction with the lock is recorded. In some embodiments, the locking device does not include quick-click and/or fob functionality to prevent offline usage that cannot be tracked and monitored by a centralized lockout management system.

In some embodiments, the lock explicitly excludes quick-click and/or fob functionality. In some embodiments, a lock may be selectively disabled for the entire system. In some embodiments, quick-click, fob, and/or other offline functionality may be selectively disabled when the lock is utilized in conjunction with devices having higher danger levels and enabled when utilized in conjunction with devices of lower danger levels.

Figure 22:
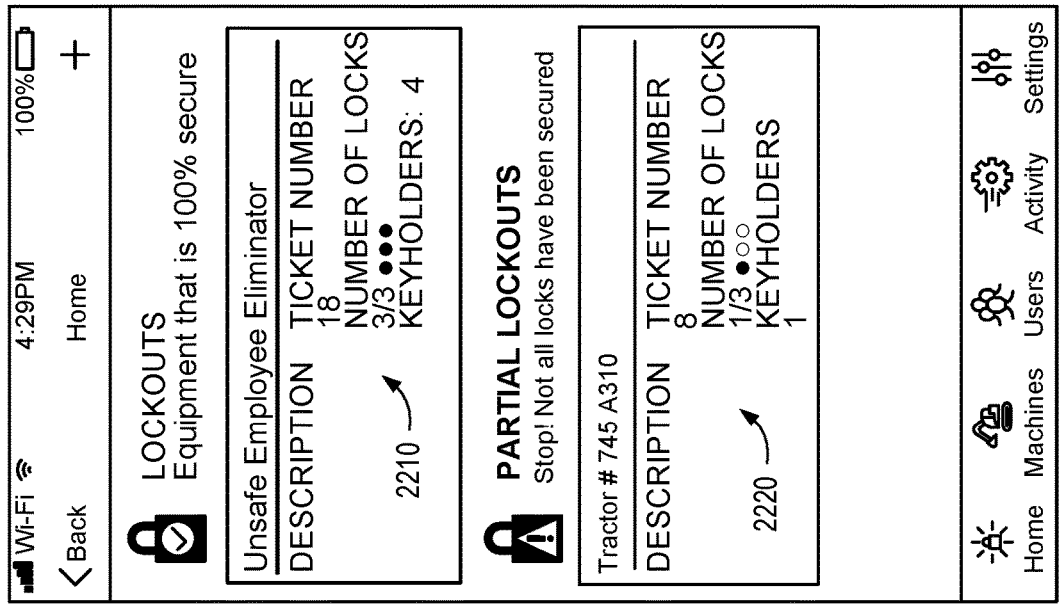
FIG. 22 illustrates an example GUI that lists completed lockouts and partial lockouts.

FIG. 22 illustrates an example GUI 2200 of a lockout list subsystem of a lockout management system that lists completed lockouts and partial lockouts. Managers and/or supervisors have an interest in monitoring the status and safe operation of machines for which they are responsible. Supervisors ensure documentation of lockouts and compliance with safety requirements. To assist supervisors, the application may identify in real-time all lockouts and/or partial lockouts. When a lockout of a machine is complete, the application displays all required documentation and lock placement confirmations (e.g., at all pertinent machine locations) in real-time. For example, a complete lockout 2210 of one lockout location has three out of three (3/3) necessary locks secured via four unique keyholders.

Partial lockouts indicate a problem with a machine for which the proper lockout procedures have not been completed. Partial lockouts may require the attention of a supervisor to ensure that operators, authorized users, and others implement proper safety protocols. Partial lockouts indicate that a machine has a problem identified, but the lockout procedures are incomplete or improperly followed. For example, the home screen of a supervisor may immediately notify them of any partial lockouts and the status of repairing locked-out machinery. As illustrated, a partial lockout 2220 of Tractor #745 has only one of three (⅓) required locks installed on the lockout locations of the machine and only a single keyholder.

Figure 23:
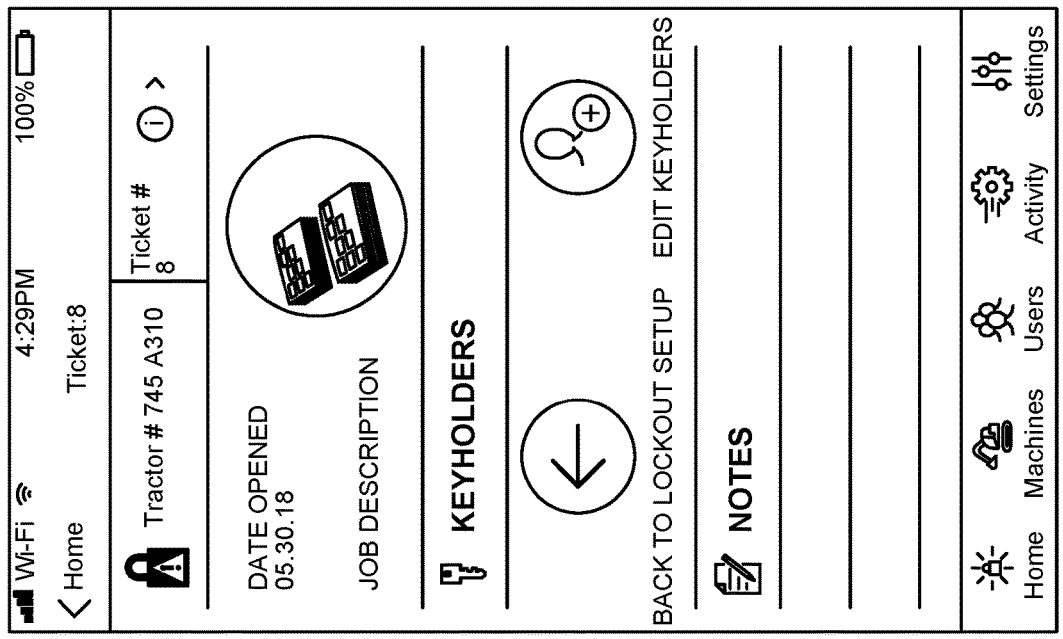
FIG. 23 illustrates an example GUI for a "home screen" or default interface for keyholders.

FIG. 23 illustrates an example "home screen" or default interface of a GUI 2300 for a keyholder. Keyholders can make notes, query the lockout setup (e.g., locations on the machine affected by the lockout and the status of repairs), and/or add other keyholders. The system may organize information based on the machine affected (e.g., Tractor #745 A310) and the ticket number (or other identifying information). The ticket may identify the affected machine locations. Ticket numbers may include a photo of the machine location and/or map of a facility to assist in rapid identification of the machine and associated repair. From this view, keyholders may authorize a repair and/or lock or unlock the device with their digital key. Keyholders may select required actions for machines at various locations. Keyholders may identify additional users (e.g., other parties affected by a specific ticket number). Prior activity or tickets the keyholder has authorized are readily accessible. For example, the keyholder may remember a similar situation to the present ticket and query his or her past activity to see the repair process followed previously. Users can also modify device settings to customize their experience (e.g., accessibility).

Figure 24:
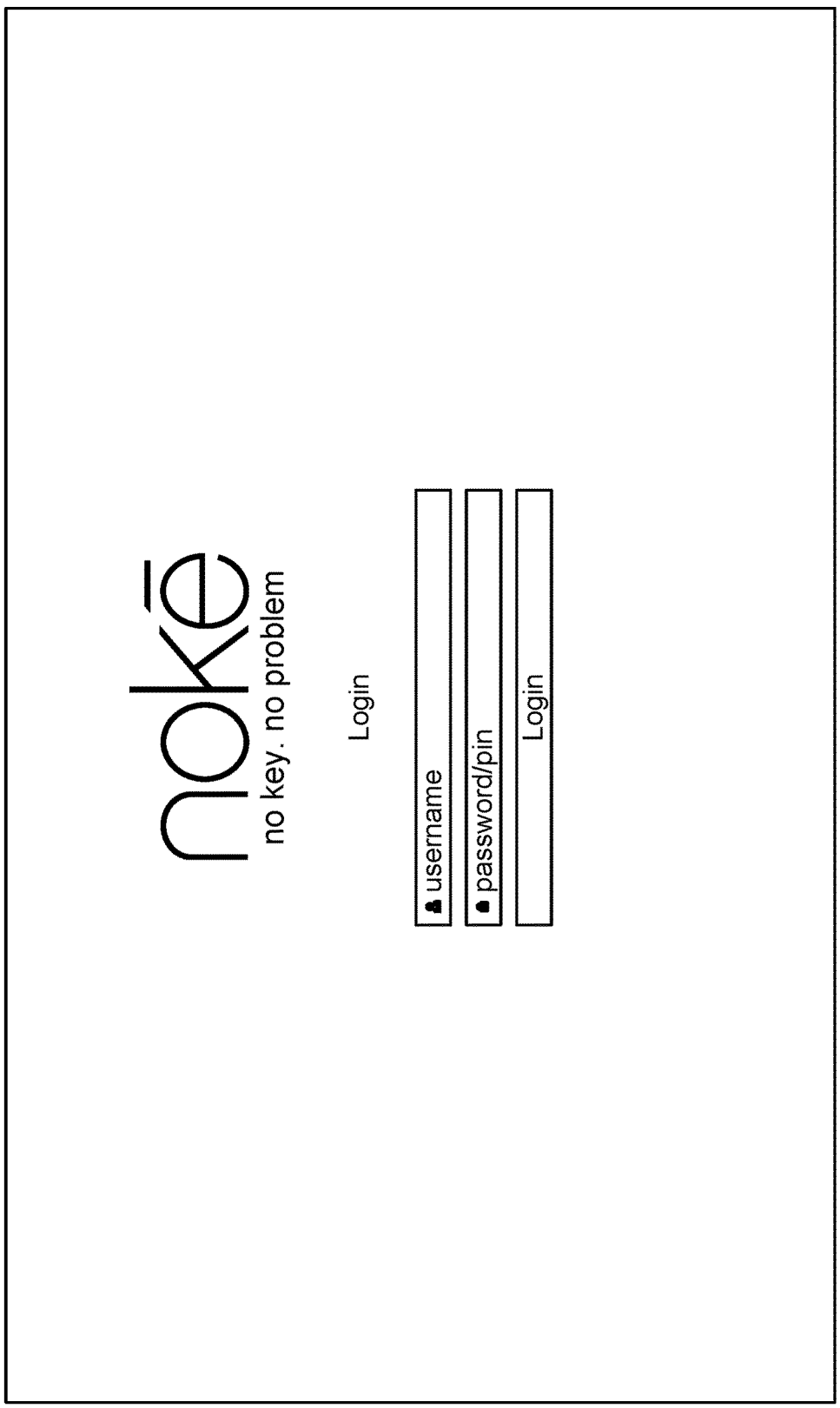
FIG. 24 illustrates an example GUI for a login screen of a management application for a lockout-tagout application.

FIG. 24 illustrates an example GUI 2400 for a login screen of a management application for a lockout management system. The illustrated example is for a desktop or laptop computer login screen; however, a similar or even identical login screen may be used on mobile platforms and/or made accessible through virtual servers.

Figure 25:
FIG. 25 illustrates an example GUI for customizing or creating a lockout procedure for a specific machine or type of machine.

FIG. 25 illustrates an example GUI 2500 of a lockout procedure creation subsystem of a lockout management system for customizing or creating a lockout (and/or tagout) procedure for a specific machine or type of machine. The customized procedure may include audio, video, text, images, and/or other useful materials to guide operators and other affected users through lockout and/or tagout procedures for a particular machine.

FIG. 26 illustrates an example GUI 2600 of a multi-lockout machine subsystem of a lockout management system for specifying lockout locations for a specific machine or type of machine. In the illustrated example, a user may customize the lockout locations of a machine associated with hazards having to due with electrical, chemical, hydraulic, pneumatic, mechanical, residual, pressured, and/or other energy types.

The lockout management system may limit access to only those users who can provide proper login credentials. In some embodiments, all users may use a single electronic device (e.g., tablet, phone, wall mounted device, laptop, computer, mobile phone, etc.). In some embodiments, fast-user switching (e.g., biometric identification, key fob recognition, etc.) is utilized to facilitate the use of shared devices. In some embodiments, each user enters credentials (e.g., PIN, username/password, token, biometric, etc.) into a single user interface. In some embodiments, authorization of a login attempt includes a real-time confirmation that the user (e.g., the technician) is certified to repair, maintain, or otherwise alter the device. In some embodiments, login includes comparing the user credentials to a credentials database. In some embodiments, the credentials database may be owned and maintained by a third party. In some embodiments, the credentials database may be maintained by the operator of the lock system and the lock system may be provided to the user as a SaaS model. In some embodiments, the credentials database may be maintained by an owner of the devices utilizing the locking system (i.e., the machines being locked out).

In some embodiments, the credentials database may maintain user certification to ensure the user is authorized. In some embodiments, the credentials database may require technicians to provide or update certifications on a periodic basis. If the user is not authenticated, the user is not authorized to lockout the device and/or the device may send a notification to the user's supervisor. If the user is authenticated, the user may lockout the device and start working. In some embodiments, a notification may be sent to the user's supervisor and/or other related parties informing the supervisor and/or another party that the user started working on the device.

In some embodiments, the credentials utilized by the user to lock the device may be different from the credentials utilized by the user to unlock the device. For instance, the user may utilize a PIN to lock the device and a user ID card (e.g., a driver's license, passport, company-issued identification) to unlock the device. The user ID may be scanned by an electronic tablet, phone, or another device. In some embodiments, the user may be required to utilize one type of credential for locking the device and a different type of credential for unlocking the device. Credentials may include but are not limited to tokens, passwords, PINs, chips, ID card, biometrics (e.g., fingerprints, facial recognition, retina recognition, voice authentication, etc.), one-time passwords, one-time PINs, scratch-off cards, magnetic stripes, knowledge-based questions, questions based on personal information, smart cards, graphical passwords, and any combination of credentials.

Upon login, the keyholder can select machine types, add new machines, add new keyholders, add roles to keyholders, customize lockout procedures, etc. The query may search a machine type based on model number, identification number, serial number, model number, manufacturer, name, or other selectable attributes. The machine type may display all the machine lockout locations. For example, referring to FIG. 29, a specific machine type may be associated with one or more hazard types. The system may allow an operator to use an interface, such as the example interface in FIG. 29, to add different hazard types applicable to the particular job site or industry.

Any hazardous energy system or machine may have a customized lockout procedure. For example, a padlock may lock a lever but may be less effective for locking a spigot on a hydraulic system. Instead, a specific lock customized for the spigot may be used to lock the hydraulic system. Similar customized locks are available for a wide variety of systems at any machine location.

In some embodiments, a centralized series of network-enabled locks may house traditional keys to traditional locking mechanisms for lockout procedures. Traditional keys may be stored inside a lockbox. A single Bluetooth-enabled lock may secure the lockbox, for example. A lockout procedure for a particular machine or piece of equipment may require multiple locks and customized locking devices. The lockbox may store the keys for all the existing locking devices, and a single Bluetooth-enabled lock that supports multiple keyholders may secure the lockbox.

Such an approach may reduce the cost of obtaining numerous customized Bluetooth locks where traditional locks are already available. This mixed system allows for customization of the lockout procedure and may utilize components of a traditional lockout method with network-compatible locks. In some embodiments, a series of small boxes (e.g., post office "PO" boxes) may house traditional keys used to lockout a machine location. Locating these boxes in a network-accessible location (e.g., the entrance to a mineshaft) may allow for network connectivity while still using traditional locks inside the mine. A locking device may directly communicate with cloud-based applications and databases, or the locking device may communicate with cloud-based applications and/or other users via close-proximity wireless networks.

FIG. 27 illustrates an example GUI 2700 of a status subsystem of a lockout management system for viewing the lockout status of managed machines and/or adding new machines. The system may enable an operator to query, customize, and/or edit machines to view attributes and lockout locations of the machine. For example, a series of machines of the same, or similar, type may have different identifiers, serial numbers, or other identifying features. The desktop application may also indicate whether the specific machine is active or inactive.

Figure 28:
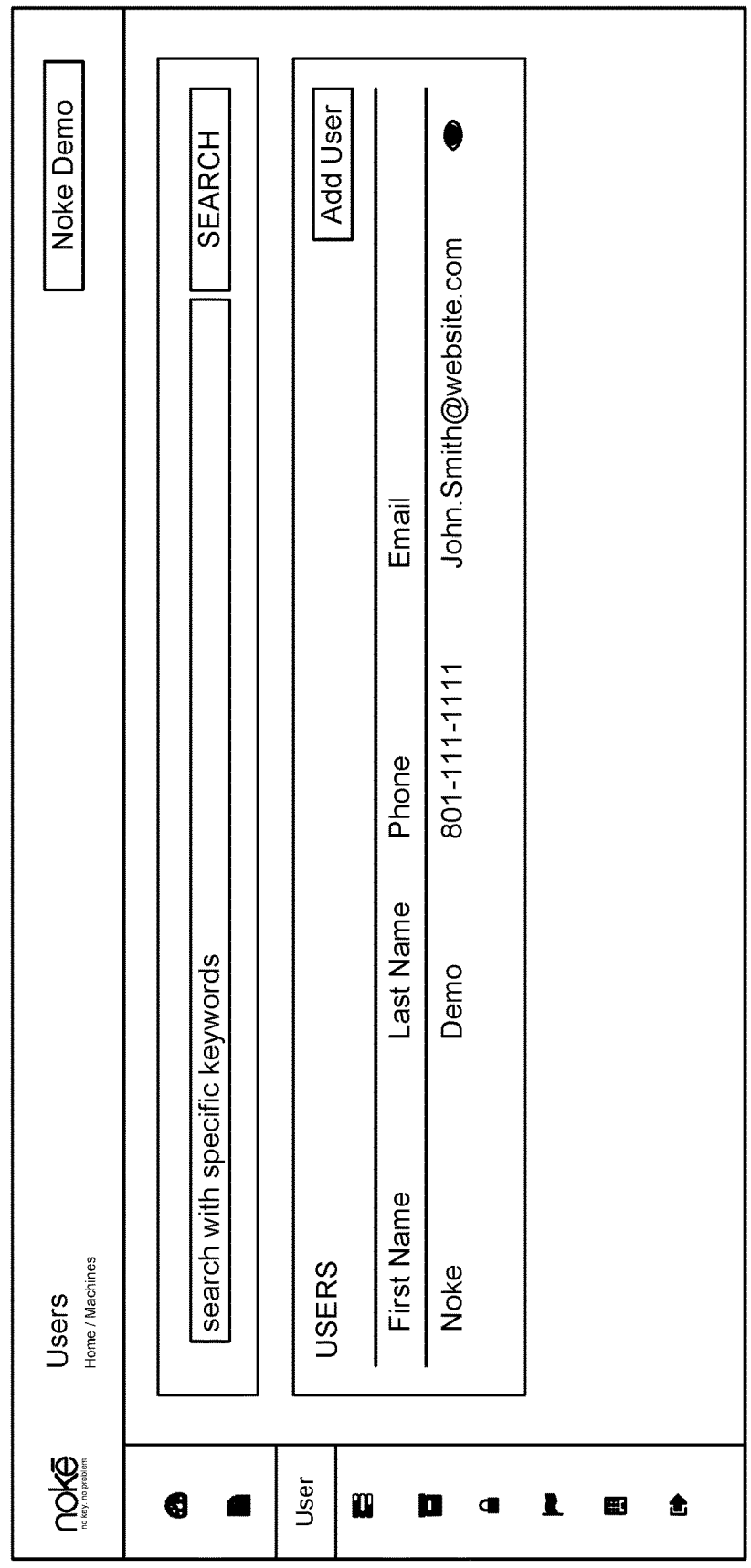
FIG. 28 illustrates an example GUI for customizing and/or creating a list of keyholders for a lockout device.

FIG. 28 illustrates an example GUI 2800 of a desktop keyholder management subsystem of a lockout management system for customizing and/or creating a list of keyholders for a lockout device. The system may facilitate editing, adding, and deleting of keyholders that can use the system in general (i.e., for all machines) or for associating specific keyholder(s) with specific machines and/or lockout locations on specific machine(s). In some embodiments, the system may indicate and/or recommend any potential users, operators, authorized users, authorized users in charge, supervisors, managers, or other (potentially) affected personnel (e.g., keyholders) based on historical usage, a database containing personnel information, and/or a standard contact list or address book.

FIG. 29 illustrates an example GUI 2900 of a network management subsystem of a lockout management system or customizing and/or creating a list of network-enabled locking devices in a system. Examples of network-enabled locking devices are described above and include, for example, the locking devices illustrated and described in conjunction with FIGS. 1-11. A similar interface may be available for Bluetooth, RFID, NFC, and/or other short-range wireless-enabled locking devices.

The lockout management system may permit queries on specific locks connected to the network. The lockout management system may display the status (e.g., locked or unlocked) of the locks. In addition, the system enables searching by each lock's name, MAC address, status, or other identifying features. The user may also view the results of the search, which provides additional details of each individual lock.

Although the lockout management system, as described, focuses on lockout procedures, safety rules recognize that not all machines are capable of lockout via a physical lock. Most safety regulations make allowances for some machines that require tagout procedures. In a tagout procedure, an actual lock may not be used. Since the machine is not capable of physical lockdown, a tag notifies affected users of potentially hazardous energy. Warning "tags" may notify users of danger but do not prevent unauthorized use. Therefore, where available, the preferred method follows lockout procedures. Where lockout procedures are unavailable, tagout procedures may notify affected users of potential dangers.

Tagout procedures follow the same methods described above but may not include a physical lock. A lockout-tagout procedure may include placing a physical or digital tag warning others of a hazardous situation, equipment failures, component safety issues, and the like. A lockout procedure frequently includes some form of a tagout procedure in addition to a lock. Tagout procedures use a warning tag instead of a physical lock. As such, any Bluetooth-enabled "tag" (e.g., a phone or tablet associated with the machine) may substitute for a network-enabled lock. Thus, the disclosure above pertaining to lockout procedures can be applied to or adapted for use in many tagout procedures. Real-time monitoring of a tagout procedure uses keyholders to approve (and remove) a tag instead of a lock.

Figure 30:
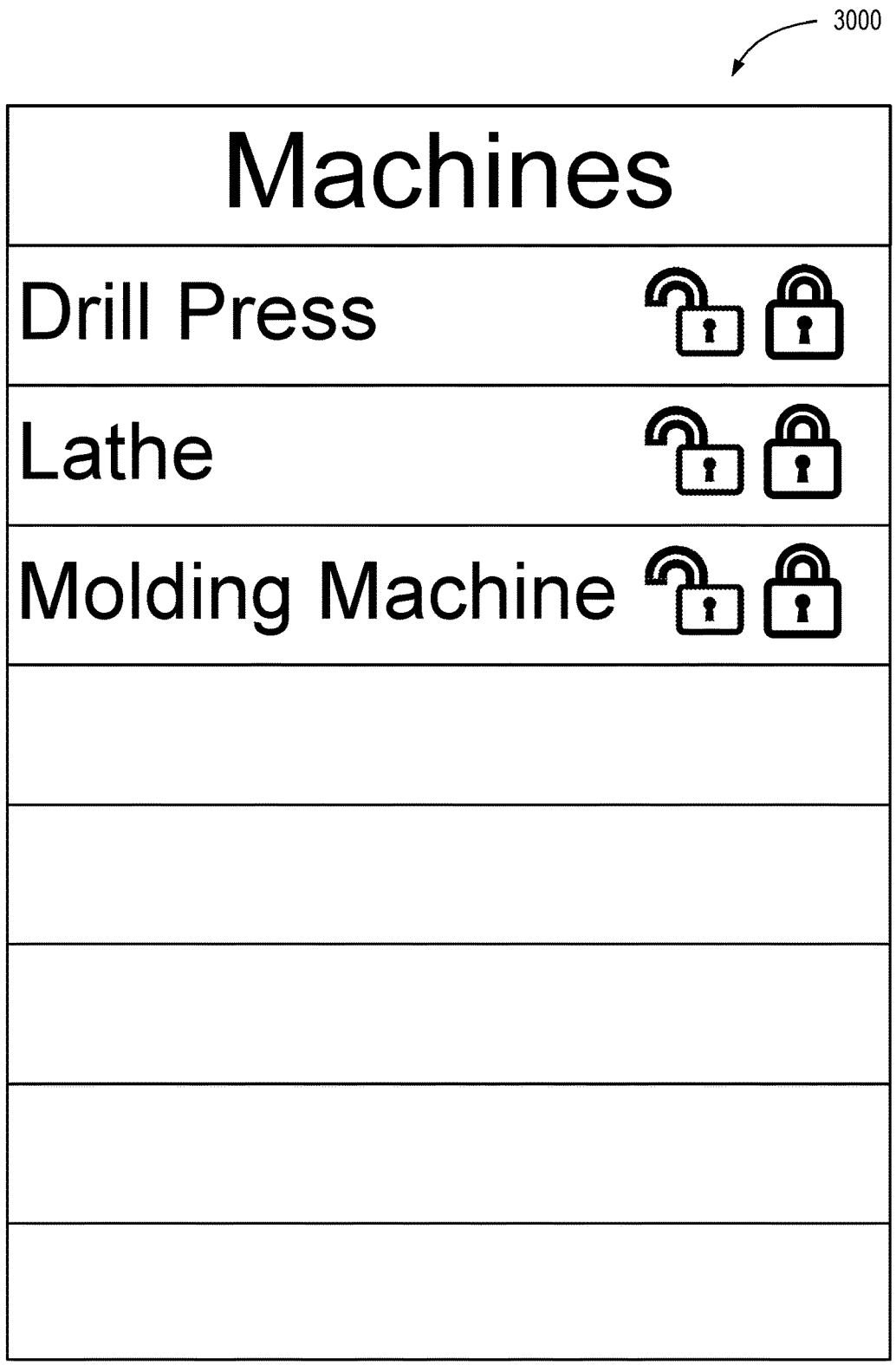
FIG. 30 illustrates a portion of an example interface of a software program for actuating, controlling, and configuring a wireless-enabled locking device associated with particular machine.

FIG. 30 illustrates a portion of an interface 3000 of a software program for actuating, controlling, and configuring a wireless-enabled electronic lock associated with a particular machine. In some instances, a locking device may be positioned on a location on a machine such that no further positioning or placement is required to lockout the machine. Rather, a user may simply select the lock icon of the specific machine to immediately lockout the machine, or at least a portion of the machine.

A user may select a lock symbol or an unlock symbol associated with a machine. The user may then enter user credentials. In some embodiments, the credentials utilized by the user to lock the device may be different from the credentials utilized by the user to unlock the device. For instance, the user may utilize a PIN to lock the device and a user ID card (e.g., a driver's license, passport, company-issued identification) to unlock the device. The user ID may be scanned by an electronic tablet, phone, or another device. In some embodiments, the user may be required to utilize one type of credential for locking the device and a different type of credential for unlocking the device. Credentials may include but are not limited to tokens, passwords, PINs, chips, ID card, biometrics (e.g., fingerprints, facial recognition, retina recognition, voice authentication, etc.), one-time passwords, one-time PINs, scratch-off cards, magnetic stripes, knowledge-based questions, personnel-based questions, smart cards, graphical passwords, or a combination of credentials.

In some embodiments, each lock is uniquely represented in the user interface and individually lockable and unlockable. In other embodiments, each machine or device that is or can be locked-out is listed and represents all the locks associated therewith. For example, selecting the lock or unlock icon for the molding machine may unlock or lock all of the electronic locks (e.g., padlocks) associated with the molding machine. The electronic locks (e.g., padlocks) may be general (unassociated) electronic locks until they are locked, at which point the user must associate them with a particular machine and/or they are automatically associated with a machine based on location and/or the access point utilized for authorization or to send lock status updates. In such embodiments, the lock and unlock icons may affect the locks associated with the device until such locks are de-associated from the particular machine.

In some embodiments, all users may use a single electronic device (e.g., tablet, phone, wall mounted device, laptop, computer, mobile phone, etc.). In some embodiments, fast-user switching is utilized. In some embodiments, each user enters credentials (e.g., PIN, username/password, token, biometrics, etc.) into a single user interface. In some embodiments, a user interface of the application may allow a mobile device to be paired with an electronic lock for faster access in the future. In some embodiments, the locking device may be locked when offline but only allow unlocking when online. Once the locking device establishes a connection, the lock established while the locking core was offline is uploaded to the server. In some embodiments, unlocking the locking device is prohibited when the locking core is not connected to the server. In some embodiments, authentication of unlock attempts made by users are exclusively allowed through servers. In some embodiments, each interaction with the locking device is recorded. In some embodiments, the locking device does not include quick-click and/or fob functionality.

In some embodiments, the lock explicitly excludes quick-click and/or fob functionality. In some embodiments, a lock may be selectively disabled for the entire system. In some embodiments, quickclick, fob, and/or other offline functionality may be selectively disabled when the lock is utilized in conjunction with devices having higher danger levels and enabled when utilized in conjunction with devices of lower danger levels.

In some embodiments, authentication may include real-time confirmation that the user (e.g., the technician) is certified to repair, maintain, or otherwise alter the device. In some embodiments, authentication includes comparing the user credentials to a credentials database. In some embodiments, the credentials database may be owned and maintained by a third party. In some embodiments, the credentials database may be maintained by the operator of the lock system and the lock system may be provided to the user as a SaaS model. In some embodiments, the credentials database may be maintained by an owner of the devices utilizing the locking system (i.e., the machines being locked out). In some embodiments, the credentials database may maintain user certification to ensure the user is authorized. In some embodiments, the credentials database may require technicians to provide or update certifications on a periodic basis. If the user is not authenticated, the user is not authorized to lockout the device and/or the device may send a notification to the user's supervisor. If the user is authenticated, the user may lockout the device and start working. In some embodiments, a notification may be sent to the user's supervisor and/or other related parties informing the supervisor and/or another party that the user started working on the device.

This disclosure has references various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

What is claimed:

1. An electronic lock, comprising:
    a lock body;
    a shackle to transition between a locked state and unlocked state relative to the lock body;
    a lock control system to maintain the shackle in the locked state in response to receiving first locking command from a first keyholder;
    a multi-keyholder management system to receive a locking command associated with a second keyholder; and
    an unlock control system to release the shackle to the unlocked state after receiving both:
        (i) an unlock command from the first keyholder providing a first keyholder credential, and
        (ii) an unlock command from the second keyholder providing a second keyholder credential.

2. The electronic lock of claim 1, wherein the electronic lock comprises a padlock and the shackle comprises a U-shaped shackle.

3. The electronic lock of claim 1, wherein each keyholder credential comprises at least one of: a username, a password, and a PIN.

4. The electronic lock of claim 1, wherein the multi-keyholder management system is configured to receive a locking command from a plurality of additional keyholders, and
    wherein the unlock control system is configured to release the shackle to the unlocked state only after receiving an unlock command and keyholder credentials from each of the first, second, and plurality of additional keyholders.

5. The electronic lock of claim 1, wherein the electronic lock further comprises a motor to rotate a cam between the locked state and the unlocked state, wherein the lock control system and the unlock control system maintain and release the shackle, respectively, by selectively driving the motor to rotate the cam.

6. The electronic lock of claim 1, wherein the unlock control system is further configured to release the shackle to the unlocked state in response to receiving a bolt-cutting unlock request from a keyholder providing a bolt-cutting keyholder credential.

7. The electronic lock of claim 1, wherein the lock control system, the multi-keyholder management system and the unlock control system comprise a combination of hardware and software components within the electronic lock.

8. The electronic lock of claim 1, wherein the multi-keyholder management system to receive the locking command associated with a second keyholder is configured to receive the locking command associated with the second keyholder from one of:
    the first keyholder; and
    the second keyholder.

9. A method for managing a lockout-tagout of a machine, comprising:
    receiving, from a mobile device, a machine identification code from an operator;
    providing, via the mobile device, instructions to the operator to lock a lockout location of a machine with an electronic lock;
    identifying the operator as a first keyholder for the electronic lock;
    receiving information identifying a second person as a second keyholder for the electronic lock;
    maintaining the lock in the locked state until both the first keyholder and the second keyholder are removed as keyholders for the electronic lock;
    removing the first keyholder as a keyholder for the electronic lock upon receipt of unlock credentials for the first keyholder;
    removing the second keyholder as a keyholder for the electronic lock upon receipt of unlock credentials from the second keyholder; and
    transmitting a wireless unlock signal to the electronic lock to transition it to an unlocked state upon determination that the electronic lock has no additional keyholders.

10. The method of claim 9, wherein the electronic lock comprises is Bluetooth-enabled, and wherein transmitting the wireless unlock signal to the electronic lock comprises transmitting a Bluetooth signal via the mobile device.

11. The method of claim 10, wherein providing the instructions to the operator for locking a lockout location comprises providing, via the mobile device, at least one of text and images describing a relative location of the lockout position on the machine.

12. The method of claim 9, further comprising:
    requesting an image be uploaded via the mobile device by the operator confirming placement of the electronic lock on the lockout location of the machine.

13. The method of claim 9, further comprising:
    providing supervisor with a list of completed lockouts within a facility and a list of partial lockouts within the facility.

14. The method of claim 9, further comprising:
    displaying, via an electronic display, a graphical user interface to facilitate;
    associating a plurality of lockout locations with a machine; and
    creating instructions for locking out each of the plurality of lock out locations.

15. A multi-user lockout management system, comprising:
    an electronic lock to be transitioned from a locked state to an unlocked state, wherein in the locked state the electronic lock prevents operation of a portion of a machine;
    a multi-keyholder management subsystem to associate an electronic lock in a locked state with a plurality of keyholders; and
    an unlock control subsystem to maintain the electronic lock in the locked state until an unlock condition is met as one of:
        (i) receiving a bolt-cutting unlock request from an entity having bolt-cutter authority to unlock an electronic lock otherwise locked by multiple keyholders, and
        (ii) receiving unique unlock credentials from each of the plurality of keyholders.

16. The multi-user lockout management system of claim 15, wherein the electronic lock comprises a padlock.

17. The multi-user lockout management system of claim 15, wherein the entity having bolt-cutter authority comprises one of an individual and a group of individuals.

18. The multi-user lockout management system of claim 15, wherein the electronic lock comprises a wireless-enabled SFIC-compatible locking core.

19. The multi-user lockout management system of claim 15, wherein the unlock control subsystem is configured to further transmit an unlock signal to the electronic lock in response to confirmation of an unlock condition.

20. The multi-user lockout management system of claim 19, wherein the electronic lock comprises a short-range wireless-enabled electronic lock, and wherein the unlock control subsystem is configured to transit a short-range wireless unlock signal, via the mobile device, to the electronic lock in response to confirmation of an unlock condition.

* * * * *